United States Patent
Mizuochi et al.

[19]

[11] Patent Number: 5,850,301
[45] Date of Patent: Dec. 15, 1998

[54] WAVELENGTH MULTIPLEXED LIGHT TRANSFER UNIT AND WAVELENGTH MULTIPLEXED LIGHT TRANSFER SYSTEM

[75] Inventors: Takashi Mizuochi; Tadayoshi Kitayama, both of Tokyo, Japan

[73] Assignee: Mitsubishi Denki Kabushiki Kaisha, Tokyo, Japan

[21] Appl. No.: 70,556

[22] Filed: Apr. 30, 1998

Related U.S. Application Data

[62] Division of Ser. No. 687,734, Jul. 26, 1996.

[30]   Foreign Application Priority Data

Aug. 24, 1995  [JP]  Japan .................................. 7-216164
Oct. 19, 1995  [JP]  Japan .................................. 7-271215

[51] Int. Cl.$^6$ ........................................................ H04J 14/02
[52] U.S. Cl. ............................ 359/124; 385/24; 359/161
[58] Field of Search ................................ 359/124, 127, 359/132–133, 161; 385/24

[56]   References Cited

U.S. PATENT DOCUMENTS 4,799,797  1/1989  Huggins .................................... 356/345
4,900,119  2/1990  Hill et al. ............................... 350/96.15
5,050,952  9/1991  Fussgager .................................. 359/114
5,469,288  11/1995  Onaka et al. ............................ 359/124
5,629,995  5/1997  Duck et al. ............................... 385/24

*Primary Examiner*—Kinfe-Michael Negash
*Attorney, Agent, or Firm*—Wolf, Greenfield & Sacks, P.C.

[57]   ABSTRACT

A branch circuit is formed by forming an optical filter by means of connecting a wavelength selective reflector to between two units of directional coupler and further assembling three units of the optical filter. In the branch circuit, the three optical filters are connected to each other so that the light coming in from a first optical filter is outputted to a third optical filter when the wave length selective reflector reflects the light, and to a second optical filter when the wavelength selective reflector passes the light therethrough; the light coming in from the second optical filter is outputted to the first optical filter when the wavelength selective reflector reflects the light, and to the third filter when the wavelength selective reflector passes the light therethrough; and also the light coming in from the third optical filter is outputted to the second optical filter when the wavelength selective reflector reflects the light and to the first optical filter when the wavelength selective reflector passes the light therethrough.

6 Claims, 22 Drawing Sheets

|  | RECEIVING WAVELENGTH | | | |
|---|---|---|---|---|
| | STATION 1 | STATION 2 | STATION 3 | STATION 4 |
| TRANSMISSION WAVELENGTH STATION 1 | | λ21 | λ31 | λ41 |
| STATION 2 | λ12 | | λ32 | λ42 |
| STATION 3 | λ13 | λ23 | | λ43 |
| STATION 4 | λ14 | λ24 | λ34 | |

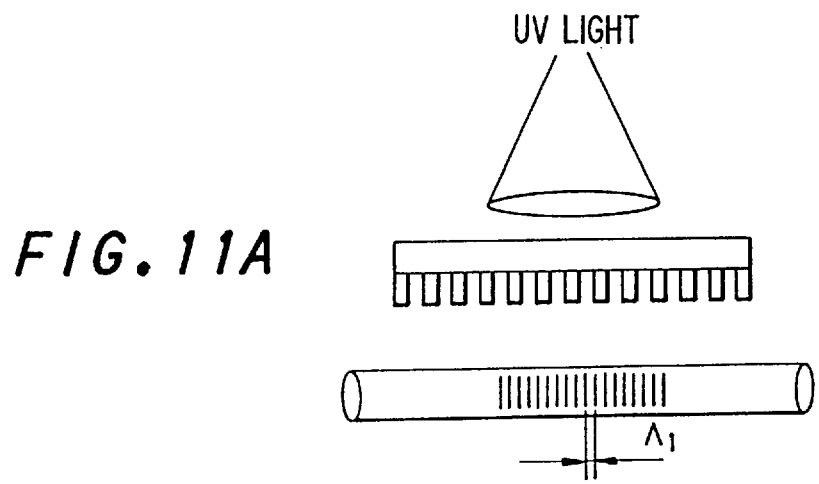
FIG. 11A
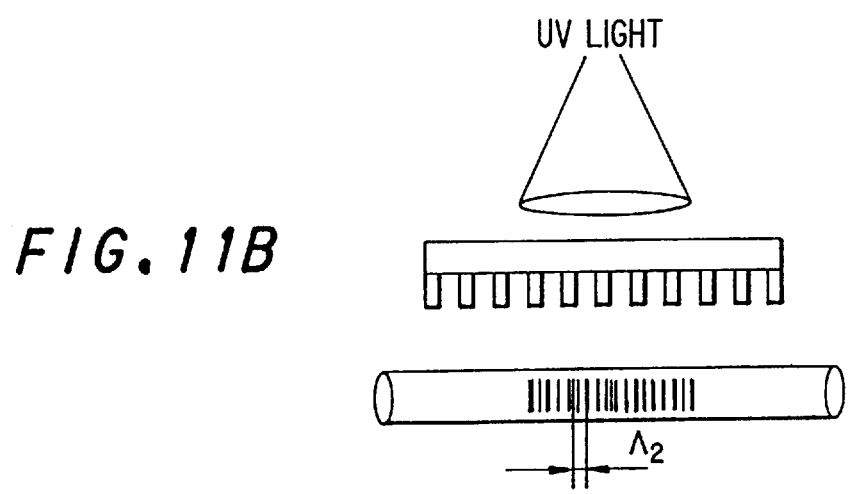
FIG. 11B
FIG. 12
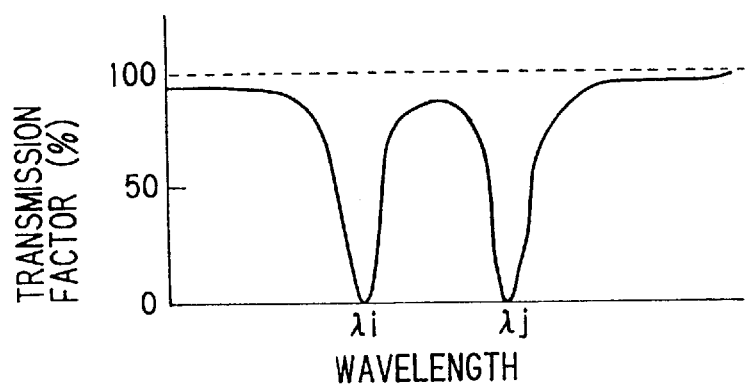

| PHASE SHIFT RATE \ WAVELENGTH TO BE DROPPED | $\lambda_1$ | $\lambda_2$ | $\lambda_3$ | $\lambda_4$ |
|---|---|---|---|---|
| PHASE SHIFT RATE by OPTICAL PHASE SHIFTER 247a | 0 | $\pi/2$ | $\pi/2$ | $\pi/2$ |
| PHASE SHIFT RATE by OPTICAL PHASE SHIFTER 247b | $\pi/2$ | $\pi/2$ | 0 | 0 |
| PHASE SHIFT RATE by OPTICAL PHASE SHIFTER 247c | 0 | $\pi/2$ | $\pi/2$ | 0 |
| PHASE SHIFT RATE by OPTICAL PHASE SHIFTER 247d | 0 | 0 | $\pi/2$ | $\pi/2$ |

WAVELENGTH MULTIPLEXED LIGHT TRANSFER UNIT AND WAVELENGTH MULTIPLEXED LIGHT TRANSFER SYSTEM

This application is a division of Ser. No. 08/687,734, filed Jul. 26, 1996.

FIELD OF THE INVENTION

The present invention relates to wavelength multiplexed optical communications.

BACKGROUND OF THE INVENTION

In association with rapid expansion of needs for optical communications, substantial increase in a transfer capacity has been required. So far increase of transfer capacity has been realized with increase in a processing speed according to a synchronous digital hierarchy (SDH), namely with introduction of time division multiplexing (TDM). Today the maximum value in the practical transfer rate is 10 Gbit/s. This is a limit speed processable in an electronic circuit for commercial use, which causes increase in costs for a transfer path terminal device.

On the other hand, in association with progress in the laser diode (LD) manufacturing technology as well as with smoothing of a gain for an erbium dope optical fiber amplifier (EDFA), a wavelength division multiplexing system has been gathering intense attentions from related people. In this system, light signals having different wavelengths are used as carrier waves, a transfer speed for one wave is suppressed at a low level, and existing types of transfer path terminal devices can be used, which makes it possible to suppress costs for the entire system.

Also if each station device is formed with light receiving circuit parts, all station devices are connected with an optically transparent medium not including a process for conversion between electricity and light. Conventionally switching of a transfer path is executed by means of converting light to electricity or converting electricity to light and also by terminating a signal to read path information and electrically switching path connection, but if the WDM technology is used, it is possible to easily switch a transfer path not by means of converting light to electricity, nor by converting electricity to light. This allows simplification of maintenance and administration management of a network.

As a wavelength multiplexed light communication device required in various types of network using the WDM technology, it is possible to enumerate (1) a light branch circuit used in a bus type of network, (2) an add/drop multiplexing circuit used in a ring-type network, and (3) a bidirectional wavelength multiplexing/separating circuit used in a star-type network.

In the submarine cable system, an optical branch circuit for branching an optical cable running in one direction to two branches running in different directions respectively has been required. So far an optical branch circuit having a two-conductor optical cable for each destination has been used, but in this case totally four conductors, two for an up-link channel and remaining two for a down-link channel, have been required, which causes increase in weight of an optical cable as well as in costs thereof. In contrast, by using the WDM technology, a number of required conductors can be reduced to a half, as described in "Optical Submarine Cable Communication" supervised by Noboru Oyama, Moriji Kuwabara, KEC, pp. 141–151, 1991.

FIG. 28 shows an example of an optical branch circuit using the WDM technology. In this figure, designated at the reference numeral 300 is an optical branch circuit, at 301a, 301b, and 301c are optical filters each for dividing a wavelength, at 302a, 302b, and 302c are optical filters each for synthesizing a wavelength. For instance, light waves having a wavelength of $\lambda 1$ and $\lambda 2$ introduced from the cable A are separated from each other by the optical filter 301a, and the light wave having a wavelength of $\lambda 1$ goes through the optical filter 302c into the cable C and the light wave having a wavelength of $\lambda 2$ goes through the optical filter 302b into the cable B. On the other hand, light waves having a wavelength of $\lambda 1$ and $\lambda 2$ respectively introduced from the cable B are separated from each other by the optical filter 301b, and the light wave having a wavelength of $\lambda 1$ goes through the optical filter 302a into the cable A, while the light wave having a wavelength of $\lambda 2$ goes through the optical filter 302c into the cable C. Thus, by using two different wavelengths, branching of an optical cable to two directions becomes possible.

By the way, in the optical filters 301a, 301b, 301c, 302a, 302b, and 302c each playing an important role in this optical branch circuit, the dielectric multilayered film filter as shown in FIG. 29 has been used in most cases.

Next, a description is made for operations of the dielectric multilayered film filter with reference to FIG. 29. In this figure WDM light coming in from a terminal 290 is collimated by a lens 291a and reaches the dielectric multilayered film 292. This dielectric multilayered film 292 is designed so that it reflects, for instance, a light wave having a wavelength of $\lambda 1$ and passes light waves having other wavelengths. The reflected light wave having a wavelength of $\lambda 1$ is focused by the lens 291b and sent to a terminal 290b. A light receiver 294 is connected to this point. On the other hand, a light transmitter 293 for a light wave having a wavelength of $\lambda 5$ is connected to a terminal 290c, the light wave passes through the lens 291c, dielectric multilayered film 292 and is outputted to the terminal 290a.

As a concrete example of the ring type of network, there is, for instance, the add/drop mutiplexer (ADM) network based on the WSM technology described in "M. J.Chawki, V. Tholey, E. Delevaque, S. Boj and E. Gay, 'Wavelength reuse scheme in a WDM unidirectional ring network using a proper fiber grating add/drop multiplexer', Electronics Letters, vol. 31, No.6, pp. 476–477, 1995". The ADM indicates a multiplexer which drops a signal to a station and at the same time add a signal transmitted from the station to other station.

A network connected with a ring type of optical fiber is connected through an optical cross-connect device to other network. For instance, a light wave having a specific wavelength of $\lambda 1$ is allocated to a station 1. Of the WDM signals arriving in the station 1, only a light wave having a wavelength of $\lambda 1$ transmitted to the station is branched by an optical filter and is received by a light receiver. On the other hand, a signal transmitted from a light transmitter in the station 1 is added to the optical fiber using a light wave having a wavelength of $\lambda 1$ as a carrier wave. To which station each light wave has been transmitted can be recognized by checking a wavelength of each light wave. Similarly a light wave having a specific wavelength of $\lambda 2$ is allocated to a station 2.

FIG. 30 shows an example of a wavelength multiplexed light transfer device according to the conventional technology which has been proposed as an optical filter required for a ring type of network. The basic principle of this type of optical filter was described in "K. O. Hill, D. C. Johnson, F. Bilodeau, S. Faucher, 'Narrow-bandwidth optical waveguide transmission filters', Electronics Letters vol. 23, No. 9, pp. 465–466, 1987", and then was described more detailedly in "D. C. Johnson, K. O. Hill, F.Bilodeau, S. Faucher, 'New design concept for a narrow band wavelength-selective optical tap and combiner' Electronics Letters vol. 23, No. 13, pp. 668–669, 1987". The same contents is also described in U.S. Pat. No. 4,900,119. A similar invention is described in Japanese Patent Laid-Open Publication No. 96605/1989.

In FIG. 30, designated at the reference numerals 310a, 310b is a fiber grating, at 311a and 311b is a 2×2 3-dB coupler, at 312 a light transmitter, and at 313 a light receiver. Also designated at the reference numerals 314a, 314b is a refractive index adjusting section, at 315a, 315b a terminal in the front stage of the 3-dB coupler 311a, at 315c, 315d a terminal in the rear stage of the 3-dB coupler 311a, at 316a, 316b a terminal in the front stage of the 3-dB coupler 311b, and at 316c, 316d a terminal in the rear stage of the 3-dB coupler 311b.

The fiber grating was invented by K. O. Hill et al. working in Communication Research Center in Canada, and when an optical fiber is exposed to an ultraviolet ray from outside, a lattice defect is caused and cyclic fluctuation of a refractive index occurs, so that a fiber grating works as a wavelength selective reflector. The fiber grating is characterized in that the wavelength reproducibility is high and the insertion loss is extremely low.

Assuming that a grating pitch of the fiber grating is $\Lambda$, an equivalent refractive index of the fiber is neff, an effective grating length is Leff, and a coupling coefficient is $\kappa$, a central wavelength $\lambda B$ of the Bragg's reflection is equal to $\Lambda$/neff ($\lambda B=\Lambda$/neff), while a reflection coefficient R at a central wavelength of the reflected light is equal to $\tanh^2(\kappa Leff)$.

For convenience of description, it is assumed herein that a Bragg's wavelength (a wavelength of a reflected light wave) for the fiber gratings 310a, 310b in this example of the conventional technology has been set to $\lambda 5$. The fiber grating itself works only as a wavelength selective reflector, but when the 3-dB coupler 311a is connected to a front stage thereof, of the WDM light waves coming in from the terminal 315a, only the light wave having a wavelength of $\lambda 1$ is reflected by the fiber grating, and can be taken out from the terminal 315b of the 3 -dB coupler.

The light coming in from the terminal 315a is divided to two portions, which are sent to the terminals 315c, 315d respectively. The light waves coming out from the terminals 315c, 315d are reflected by the fiber gratings 310a, 310b respectively and return to the 3-dB coupler 311a again, but when returning from the terminal 315a to the terminal 315a, a light wave flowing through the first route comprising the terminal 315a, terminal 315c, fiber grating 310a (reflection), terminal 315c, and terminal 315a in this order is synthesized with a light wave flowing through a second route comprising the terminal 315a, terminal 315d, fiber grating 310b (reflection), terminal 315d, and terminal 315a in this order, and the synthesized light wave goes out from the terminal 315a, but a phase difference of $\pi/2$ between a light wave passing through the coupler and the coupled light wave is generated in the 3-dB coupler, so that a phase difference of $\pi$ is generated between the transmitted light waves passing through the light paths from the terminal 315a to the terminal 315c and from the terminal 315c to the terminal 315a in the first route and between the coupled light waves passing through the light paths from the terminal 315a to the terminal 315d and from the terminal 315d to the terminal 315a in the second route, and a phase of the light in the first route is reverse to that of the light in the second route, so that interference between the light waves is canceled.

When returning from the terminal 315a to the terminal 315b, a light wave flowing through a first route comprising the terminal 315a, terminal 315c, fiber grating 310a (reflection), terminal 315c, and terminal 315b in this order is synthesized with a light wave flowing in a second route comprising the terminal 315a, terminal 315d, fiber grating 310b (reflection) terminal 315d, and terminal 315b, and the synthesized light wave goes out from the terminal 315b, but a light wave running from the terminal 315a to the terminal 315c in the first route is a transmitted light wave and a light wave running from the terminal 315c to the terminal 315b in the first route is a coupled light wave, while in the second route a light wave running from the terminal 315a to the terminal 315d is a coupled light wave and that running from the terminal 315d to the terminal 315b is a transmitted light, and thus a phase delay of $\pi/2$ is generated in both the light waves running in the first and second routes, meaning that the total phase delay is $\pi$, and an interference between the light waves is intensified. For this reason, the light wave having a wavelength $\lambda 5$ from the terminal 315a is sent to the terminal 315b.

Light waves each having a wavelength other than $\lambda 5$ and not reflected by the fiber grating reach the 3-dB coupler 311b, but when sent from the terminal 315a to the terminal 316c, a light wave running through the first route comprising the terminal 315a, terminal 315c, fiber grating 310a (transmission), terminal 316a and terminal 316c in this order is synthesized with a light wave running through the second route comprising the terminal 315a, terminal 315d, fiber grating 310b (transmission), terminal 316b, and terminal 316c, and the synthesized light wave goes out of the terminal 316c, but a light wave passing through the light paths from the terminal 315a to the terminal 315c and from the terminal 316a to the terminal 316c in the first route is a transmitted light wave, while the light wave passing through the light paths from the terminal 315a to the terminal 315d and from the terminal 316b to the terminal 316c in the second route is a coupled light wave, so that a phase difference of $\pi$ is generated, and a phase of the light wave running through the first route is reverse to that of the light wave running through the second route, so that interference between the light waves is canceled When sent from the terminal 315a to the terminal 316d, a light wave running through a first route comprising the terminal 315a, terminal 315c, fiber grating 310a (transmission), terminal 316a,and terminal 316d is synthesized with a light wave running through a second route comprising the terminal 315a, terminal 315d, fiber grating 310b (transmission), terminal 316b,and terminal 316d,and the synthesized light wave goes out of the terminal 316d,but in the first route a light wave passing through the light path from the terminal 315a to the terminal 315c is a transmitted light wave and a light wave passing through the light path from the terminal 316a to the terminal 316d is a coupled light wave, while in the second route a light wave passing through the light path from the terminal 315a to the terminal 315d is a coupled light wave and that passing through the light path from the terminal 316a to the terminal 316d is a transmitted light wave, so that a common mode by a phase delay of $\pi/2$ is generated between the light wave running through the first route and that running through the second route, and the light waves is intensified by this interference. For this reason, light waves each coming in from the terminal 315a and having a wavelength other than $\lambda 5$ is sent to the terminal 316d.

On the other hand, a signal having a wavelength of $\lambda 5$ to be inserted is transmitted from the light transmitter 312 connected to the terminal 316c and is set to the terminal 316d. The operations are the same as those in a case when a light wave coming in from the terminal 315a and having a wavelength of $\lambda 5$ is sent to the terminal 315b. For this reason, a light wave coming in from the terminal 315a and having a wavelength other than $\lambda 5$ is sent to the terminal 316d.

It should be noted that the refractive index adjusting section 314a adjusts a refractive index so that a length of each light path from the 3-dB coupler 311a to each of the fiber gratings 310a, 310b will be identical. Also the refractive index adjusting section 314b adjusts a refractive index so that a length of each light path from the 3-dB coupler 311b to each of the fiber gratings 310a, 310b will be identical.

The refractive index adjusting sections 314a, 314b can adjust a refractive index by means of exposure to a ultraviolet ray like in the method of manufacturing a fiber grating. This technology is described in Japanese Patent Laid-Open No. 298702/1992.

Concrete examples of the star-shaped network include the LAMBDANET. Detailed description thereof is provided in "M. S. Goodman, H. Kobrinski, M. P. Vecchi, R. M. Bulley, and J. L. Gimlett, IEEE Journal of Selected Areas in Communications, vol. 8, p. 995, 1990". A light transmitter for a light wave having an allocated wavelength is provided in each station. A light signal going out of the light transmitter passes through a star coupler and reaches all the stations. Each station selects a light wave having a desired wavelength from all light waves received by the station. For instance, a specific wavelength $\lambda 1$ is allocated to a light transmitter provided in the station 1. On the other hand, in a case where a wavelength of signal for a light receiver in the station 1 to receive is $\lambda 5$ which is a wavelength specific to a signal transmitted by a light transmitter provided in a station 5, the light receiver selectively receives the signal having the wavelength. A function required to an optical filter is bidirectional wavelength multiplexing for light waves having wavelengths of $\lambda 1$ and $\lambda 5$. Conventionally a dielectric multilayered film filter has been used for this optical filter.

Configuration of an optical filter based on the conventional technology was as described above. Several problems in the conventional type of optical filter have degraded operations and characteristics of the system and also complicated the configuration. One of the problems relating to the example of the conventional technology 1 is that a dielectric multilayered film filter has a large passage loss and many optical parts are used, which makes it difficult to assemble the optical filter.

Furthermore an optical signal once goes out of an optical fiber into a space, passes through a lens or a dielectric multilayered film, and then goes into an optical fiber again, so that displacement of the light axis easily occurs, and if displacement of the light axis should occur, a severe accident such as breakage of an optical cable which is a trunk line may easily occur.

One of the problems relating to the example of the conventional technology 2 occurs in a ring type of network in a case where two or more light waves having different wavelengths are allocated to a station with increased line demands. However, two light waves having different wavelengths can not be dropped nor added by the optical filter shown in FIG. 30 simultaneously.

In the optical filter shown in FIG. 30, it is extremely difficult to achieve the refractive index of 100% for the fiber gratings 310a and 310b. When a coupling parameter $\kappa L$ is 2, R is 93%. In this step, of the light waves each sent from the light transmitter 312 and having a wavelength of $\lambda 5$ (called an adding light), those not reflected and passing therethrough, equivalent to 7% of all the light waves, may go into the light receiver 313 (This light is called crosstalk light). The light receiver 313 receives a light wave coming in from the terminal 315a and having a wavelength of $\lambda 5$ (this light is called dropping light). Namely an adding light from the transmitter 312 may cause crosstalk with a dropping light to be received by the receiver 313, which disadvantageously degrades the receiving characteristics.

In FIG. 30, if there are no fiber gratings 310a, 310b, of the power Pa of the adding light coming in from the terminal 316c, a ratio of a power added to the terminal 315b vs a power outputted to the terminal 315a is defined as isolation $\eta$.

Namely:

$$\eta = (\text{Power outputted to the terminal } 315a)/(\text{Power outputted to the terminal } 315b) \quad (1)$$

In a case where the refractive index adjusting sections 314a and 314b can be manufactured so that a length of a light path in the 3-dB coupler 311a is completely identical to that of in the 3-dB coupler 311b, $\eta$ is zero (0), but in the manufacturing technology currently available, $\eta$ can be suppressed at most to a range from 0.1 to 0.01. Herein, in a case where an excessive loss in all light paths is ignored, power of the adding light coming in from the terminal 316c and going into the terminal 315b is expressed by the expression of $Pa(1-R)/(1-\eta)$. On the other hand, of power Pd of a light wave coming in from the terminal 315a, power of a dropping light outputted to the terminal 315b is expressed by the expression of $Pd/(1-\eta)$ Then, a ratio of crosstalk light vs. dropping light, namely the crosstalk X is given by the following expression:

$$X = Pa(1-R)/(Pd) \quad (2)$$

When R is 93% and Pa is equal to Pd, X is 0.07 (=−11.6 dB).

The power penalty PP when crosstalk occurs in a state where a difference $\Delta$ between an optical frequency of an adding light and that of a dropping light is zero (0) and polarization of the former is identical to that of the latter is expressed by the following expression:

$$PP = -10 \log(1 - 4 \cdot \sqrt{x}) \quad (3)$$

Namely, when X is 0.02, a power penalty of up to 3.6 dB is generated.

FIG. 31 shows a result of an experiment carried out using a 10 Gbit/s light transfer device to know a power penalty against crosstalk X. In this figure, a black circle indicates a value obtained by the experiment and a solid line indicates a value by computing according to the expression (1). A result of the experiment well coincided with the computed value, and it was confirmed that a power penalty of 1 dB is generated against crosstalk of only −25 dB. To suppress a power penalty to, for instance, 0.2 dB or less, the crosstalk must be suppressed under −39 dB. The refractive index R to satisfy the requirement is computed as 99.99% from the expression (2). When viewed from a viewpoint of actual conditions in production of fiber gratings, it is extremely difficult to satisfy this requirement.

In a ring type of network, sometime it is required to switch a wavelength of dropped and adding light wave to a given wavelength in association with fluctuation in demands for each line. However, in the optical filter shown in FIG. 30, it is impossible to freely select a wavelength.

An optical filter required for a star-shaped network can be formed with the dielectric multilayered film as shown in FIG. 29, a section between an input fiber and an output fiber in the dielectric multilayered film optical filter is formed with a lens system, so that not only the insertion loss is large, but also the assembly is difficult, which is disadvantageous for mass production thereof.

A first object of the present invention is to provide an optical branch circuit in which a passage loss due to wavelength multiplexing is small and displacement of light axis never occurs.

A second object of the present invention is to insure a communication path for communication between terminal stations with each other by increasing terminal stations each accommodated in a wavelength multiplexed optical transfer system and separating a troubled portion therefrom even if any trouble occurs in the transfer path.

A third object of the present invention is to provide a construction in which a passage loss due to wavelength multiplexing is small and a number of wavelengths for a specified path can be obtained as many as possible in the optical branch circuit in which displacement of light axis never occurs.

A fourth object of the present invention is to provide an optical dropping/adding circuit which can communicate with any other station.

A fifth object of the present invention is to provide an optical filter which can multiplex a plurality of light waves by dropping and adding them.

A sixth object of the present invention is to provide an optical filter which can suppress a frequency of crosstalk and of which the transfer characteristics is not degraded even in a case where a wavelength of a dropping light wave is the same as that of an adding light wave.

A seventh object of the present invention is to provide an optical filter which can select a wavelength to be dropped and added for multiplexing.

An eighth object of the present invention is to provide an optical filter in which a loss is small when bidirectional WDM is executed, and also which can easily be assembled and is suited to mass production.

A wavelength multiplexed light transfer unit according to the present invention comprises first, second, and third optical filters each having a first terminal into which a light signal having a specified wavelength $\lambda 1$ and a light signal having a wavelength other than $\lambda 1$ are inputted; a second terminal which outputs the light signal having a wavelength $\lambda 1$ inputted into this first terminal; a third terminal into which the light signal having a wavelength other than $\lambda 1$ is inputted; and a fourth terminal which outputs the light signal having a wavelength other than $\lambda 1$ inputted to the first terminal, and also each outputting the light signal having a wavelength other than $\lambda 1$ inputted into the third terminal to the second terminal; in which the third terminal of the first optical filter and the fourth terminal of the second optical filter are connected to each other; the third terminal of the second optical filter and the fourth terminal of the third optical filter are connected to each other; and the third terminal of the third optical filter and the fourth terminal of the first optical filter are connected to each other.

In a wavelength multiplexed light transfer system according to the present invention, terminal station equipments each having a light transmitting/receiving device for transmitting or receiving a light signal having a specified wavelength $\lambda 1$ and that having a wavelength other than $\lambda 1$ through the wavelength multiplexed light transfer unit vertically connected to each other are communicated with each other.

A wavelength multiplexed light transfer unit according to the present invention comprises, a first filter having a first terminal into which a light signal having a specified wavelength $\lambda 1$ and a light signal having a wavelength other than $\lambda 1$ are inputted; a second terminal which outputs the light signal having a wavelength of $\lambda 1$ inputted into this first terminal; a third terminal into which the light signal having a wavelength other than $\lambda 2$ is inputted; and a fourth terminal which outputs the light signal having a wavelength other than $\lambda 1$ inputted to the first terminal; and second and third filters each having: a first terminal into which a light signal having a specified wavelength $\lambda 2$ and a light signal having a wavelength other than $\lambda 2$ are inputted; a second terminal which outputs the light signal having a wavelength of $\lambda 2$ inputted into this first terminal; a third terminal into which the light signal having a wavelength other than $\lambda 2$ is inputted; and a fourth terminal which outputs the light signal having a wavelength other than $\lambda 2$ inputted to the first terminal; in which the third terminal of the first optical filter and the fourth terminal of the second optical filter are connected to each other; the third terminal of the second optical filter and the fourth terminal of the third optical filter are connected to each other; and the third terminal of the third optical filter and the second terminal of the first optical filter are connected to each other.

A wavelength multiplexed light transfer unit according to the present invention comprises, an optical filter having a first terminal for receiving and inputting a light wavelength multiplexed signal having a wavelength within a specified wavelength band $\lambda B1$ allocated to a station for receiving as well as a light wavelength multiplexed signal having a wavelength outside the specified wavelength band $\lambda B1$, a second terminal for outputting the light wavelength multiplexed signal having a wavelength within the wavelength band $\lambda B1$ inputted into the first terminal, and a third terminal the light wavelength multiplexed signal having a wavelength outside the wavelength band $\lambda B1$ inputted into the first terminal; a light receiver into which the light wavelength multiplexed signal outputted to the second terminal of the optical filter is inputted; a light transmitter for outputting a light wavelength multiplexed signal having a wavelength for transmission within a wavelength band allocated from the station to a receiving station; and a directional coupler for synthesizing the light wavelength multiplexed signal having a wavelength outside the wavelength band $\lambda B1$ outputted from the third terminal of the optical filter and the light wavelength multiplexed signal outputted from the light transmitter and outputting the synthesized signal for transmission.

A wavelength multiplexed light transfer unit according to the present invention comprises, an optical filter having a first terminal for receiving a light wavelength multiplexed signal having a wavelength within any of N pieces of wavelength band from $\lambda B1$ to $\lambda BN$ as well as a light wavelength multiplexed signal having a wavelength outside the wavelength bands, a second terminal for outputting a light wavelength multiplexed signal having a wavelength within wavelength bands from $\lambda B1$ to $\lambda BN$ inputted into this first terminal, a third terminal for inputting light wavelength multiplexed signal having a wavelength within the wavelength bands from $\lambda B1$ to $\lambda BN$, and a fourth terminal for outputting the light wavelength multiplexed signal having a wavelength outside the wavelength bands inputted into the first terminal as well as the light wavelength multiplexed signal having a wavelength within the wavelength bands from λB1 to λBN inputted into the third terminal; a light receiver for receiving the light wavelength multiplexed signal outputted to the second terminal of the optical filter; and a light transmitter for outputting the light wavelength multiplexed signal having a wavelength within the wavelength bands from λB1 to λBN inputted to the third terminal of the optical filter.

A wavelength multiplexed light transfer unit according to the present invention comprises a grating light guide path having a plurality of reflected wavelength formed in the identical grating light guide path as an optical filter.

A wavelength multiplexed light transfer unit according to the present invention comprises, an optical filter having a first terminal for receiving a light signal having a wavelength within a specified wavelength band λB1 as well as a light signal having a wavelength outside the wavelength band λB1, a second terminal for outputting the transmitted light signal having a wavelength within the wavelength band λB1 inputted into this first terminal, a third terminal for receiving a light signal having a wavelength within the wavelength band λB1, and a fourth terminal for outputting the light signal having a wavelength outside the wavelength band λB1 inputted into the first terminal as well as the light signal having a wavelength within the wavelength band λB1 inputted into the third terminal; a light receiver for receiving a light signal outputted to the second terminal of the optical filter; a light transmitter for outputting a light signal to the third terminal of the optical filter; and a light frequency control means for controlling the light transmitter so that the light transmitter will oscillate a light having a wavelength displaced by a specified value from a wavelength of a light signal received by the light receiver.

A wavelength multiplexed light transfer unit according to the present invention comprises, a first optical filter having a first terminal for receiving a light signal having a specified wavelength λ1 as well as a light signal having a wavelength other than the wavelength λ1, a second terminal for outputting the light signal having a wavelength λ1 inputted into this first terminal, a third terminal for outputting a light signal having a wavelength other than the wavelength λ1 inputted into the first terminal; a second optical filter having a fourth terminal for receiving the light signal having a wavelength other than the wavelength λ1 outputted from the third terminal of this first optical filter, a fifth terminal for receiving the light signal having the specified wavelength λ1 as well as that having a wavelength other than the wavelength λ1, and a sixth terminal for outputting the light signal having a wavelength other than the wavelength λ1 inputted into the fourth terminal as well as a transmitted light signal having a wavelength λ1 inputted into the fifth terminal; a light receiver for receiving a light signal outputted to the second terminal of the first optical filter; and a light transmitter for outputting a light signal to the fifth terminal of the second optical filter.

A wavelength multiplexed light transfer unit according to the present invention comprises, a first optical filter having a first terminal for receiving a light signal having a specified wavelength λ1 as well as a light signal having a wavelength other than the wavelength λ1 , a second terminal for outputting the light signal having a wavelength λ1 inputted into this first terminal, a third terminal for outputting a light signal having a wavelength other than the wavelength λ1 inputted into the first terminal; and a second optical filter having a fourth terminal for receiving the light signal having a wavelength other than the wavelength λ1 outputted from the third terminal of this first optical filter, a fifth terminal for receiving the light signal having the specified wavelength λ1 as well as that having a wavelength other than the wavelength λ1, and a sixth terminal for outputting the light signal having a wavelength other than the wavelength λ1 inputted into the fourth terminal as well as a transmitted light signal having a wavelength λ1 inputted into the fifth terminal; in which the third terminal of the first optical filter and the fourth terminal of the second filter are connected to each other with a wavelength selective reflector in which a center wavelength of reflection is λ1.

A wavelength multiplexed light transfer unit according to the present invention comprises, a first optical filter having a first terminal for receiving a light signal having a specified wavelength λ2 as well as a light signal having a wavelength other than the wavelength λ2 , a second terminal for outputting the light signal having a wavelength λ2 inputted into this first terminal, a third terminal for outputting a light signal having a wavelength other than the wavelength λ2 inputted into the first terminal; a second optical filter having a fourth terminal for receiving the light signal having a wavelength other than the wavelength λ2 outputted from the third terminal of this first optical filter, a fifth terminal for receiving the light signal having the specified wavelength λ2, and a sixth terminal for outputting the light signal having a wavelength other than the wavelength λ2 inputted into the fourth terminal as well as a transmitted light signal having a wavelength λ2 inputted into the fifth terminal, a third optical filter having a seventh terminal for receiving a light signal having a specified wavelength λ1 as well as a light signal having a wavelength other than the wavelength λ1, an eighth terminal for outputting the light signal having a specified wavelength λ2 as well as a light signal having a wavelength λ1 inputted into the seventh terminal, a ninth terminal for receiving a light signal having a wavelength λ2 outputted to the eighth terminal, and a tenth terminal for outputting a light signal having a wavelength other than the wavelength λ1 received from the seventh terminal; and a fourth optical filter having a twelfth terminal for receiving the light signal having a wavelength other than the wavelength λ1 outputted from the tenth terminal of the third optical filter, a thirteenth terminal for receiving the light signal having the specified wavelength λ1 as well as the light signal having a specified wavelength λ2 , a fourteenth terminal for outputting the light signal having a wavelength λ1 received from the thirteenth terminal as well as a light signal having a wavelength other than the wavelength λ1 received from the twelfth terminal, and an eleventh terminal for outputting the light signal having a wavelength λ2 received from the thirteenth terminal; in which the second terminal and the ninth terminal are connected to each other, and the fifth terminal and the eleventh terminal are connected to each other.

A wavelength multiplexed light transfer unit according to the present invention comprises, a first light circulator having a first port for receiving N waves of light wavelength multiplexed signal having specified wavelengths from λ1 to λN, a second port for outputting the light wavelength multiplexed signal inputted into the first port, and a third port for outputting the light wavelength multiplexed signal inputted into the second port; a directional coupler having a first terminal for receiving a light wavelength multiplexed signal having a wavelength within any of wavelength bands from λ1 to λN outputted from the second port of the first light circulator and also outputting a light wavelength multiplexed signal having a wavelength within any of wavelength bands from λ1 to λN to the second port of the first light circulator, a second terminal for receiving a light wavelength multiplexed signal, a third terminal and a fourth terminal each for dividing a light signal having a wavelength within any of the wavelength bands $\lambda 1$ to $\lambda N$ inputted into the first and second terminals into two portions, outputting the divided light signal, and receiving light signals having wavelengths from $\lambda 1$ to $\lambda N$, the directional coupler outputting a synthesized light signal to the second terminal if a phase of a light signal inputted into the third terminal and returning the first terminal is reversed to that of a light signal inputted into the fourth terminal and returning to the first terminal, and also outputting a synthesized light signal to the first terminal if the phases of the two signals are identical, outputting a synthesized light signal to the first terminal if a phase of a light signal inputted into the third terminal and returning to the second terminal is reversed to that of a light signal inputted into the fourth terminal and returning to the second terminal, and also outputting a synthesized light signal to the second terminal if the phases of the two signals are identical; first to N-th wavelength selective reflectors reflecting light signals having wavelengths from $\lambda 1$ to $\lambda N$ and respectively connected to the third terminal of the directional coupler; first to N-th light phase shifters each provided in correspondence to each of the first to N-th wavelength selective reflector and shifting a phase of a light signal passing therethrough; N+1-th to 2N-th wavelength selective reflectors reflecting light signals having wavelengths from $\lambda 1$ to $\lambda N$ and respectively connected to the fourth terminal of the directional coupler; a light phase shifter control circuit for controlling a shaft rate for each of the first to N-th light phase shifters so that a phase of a light signal outputted from the first or second terminal of the directional coupler to the third and fourth terminals, reflected by any of the first to N-th wavelength selective reflectors, inputted into the third terminal and returning to the first or second terminal will be reverse to that of a light signal reflected by any of the N+1-th to 2N-th wavelength selective reflectors, inputted into the fourth terminal and returning to the first or second terminal in a case of a light signal to be branched, and also so that the former will be the same as the latter in a case of a light signal to be passed therethrough; a second light circulator having a first port for receiving a light wavelength multiplexed signal outputted from the second terminal of the directional coupler and also outputting a light wavelength multiplexed signal to the second terminal of the directional coupler, a second port for outputting a light wavelength multiplexed signal inputted into this first port, and a third port for receiving a light wavelength multiplexed signal and outputting the signal to the first port; a light receiver for receiving the light wavelength multiplexed signal outputted to the second port of the second light circulator; and a light transmitter for outputting a light wavelength multiplexed signal to the third port of the second light circulator.

A wavelength multiplexed light transfer unit according to the present invention comprises, a first optical filter having a first terminal for receiving and outputting a light signal having a specified wavelength $\lambda i$, a light signal having a wavelength $\lambda J$, and a light signal having a wavelength other than the wavelengths $\lambda i$ and $\lambda j$, a second terminal for outputting the light signal having a wavelength $\lambda i$ inputted into this first terminal and receiving a light signal having a wavelength $\lambda i$, and a third terminal for outputting a light signal having a wavelength other than the wavelength $\lambda i$ inputted into the first terminal, the first optical filter outputting the light signal having a wavelength $\lambda i$ inputted into the second terminal to the first terminal; a second optical filter having a fourth terminal for receiving the light signal having a wavelength other than wavelength $\lambda i$ outputted from the third terminal of the first optical filter and a fifth terminal for outputting the light signal having a wavelength $\lambda j$ inputted into this fourth terminal; a light transmitter for outputting a light wavelength multiplexed signal for the second terminal of the first optical filter; and a light receiver for receiving the light wavelength multiplexed signal outputted to a second terminal of the second optical filter.

A wavelength multiplexed light transfer unit according to the present invention forms an optical filter with a grating light guide path in which a wavelength of a first reflected light is shorter than that of a second reflected light as the first optical filter.

A wavelength multiplexed light transfer unit according to the present invention comprises, a first optical filter having a first terminal for receiving and outputting a light signal having a specified wavelength $\lambda i$, a light signal having a wavelength $\lambda j$ and a light signal having a wavelength other than the wavelengths $\lambda i$, $\lambda j$, a second terminal for outputting the light signal having the wavelength $\lambda i$ inputted into this first terminal, and a third terminal for outputting a light signal having a wavelength $\lambda i$ inputted into the thirst terminal, the first optical filter outputting the light signal having the wavelength $\lambda j$ inputted into the third terminal to the first terminal; a second optical filter having a fourth terminal for receiving a light signal having a wavelength $\lambda i$ outputted from the second terminal of the first optical filter and a fifth terminal for outputting the light signal having the wavelength $\lambda i$ inputted into this fourth terminal; a light transmitter for outputting a light wavelength multiplexed signal to the third terminal of the first optical filter; and a light receiver for receiving the light wavelength multiplexed signal outputted to the fifth terminal of the second optical filter.

A wavelength multiplexed light transfer unit according to the present invention formes an optical filter with a grating light guide path in which a wavelength of a first reflected light is shorter than that of a light signal transmitted from the light transmitter as the first optical filter.

Other objects and features of this invention will become understood from the following description with reference to the accompanying drawings.

BRIEF DESCRIPTION OF THE DRAWINGS

FIG. 11 is a view showing a manufacturing method in Embodiment 6 according to the present invention;

FIG. 12 is a view showing transmittance when two types of wavelength are dropped and added;

DESCRIPTION OF THE PREFERRED EMBODIMENTS

An object of the present embodiment is to realize an optical branch circuit which branches a wavelength multiplexed light coming from one direction to two directions by using a wavelength selective reflector and a directional coupler.

Figure 1:
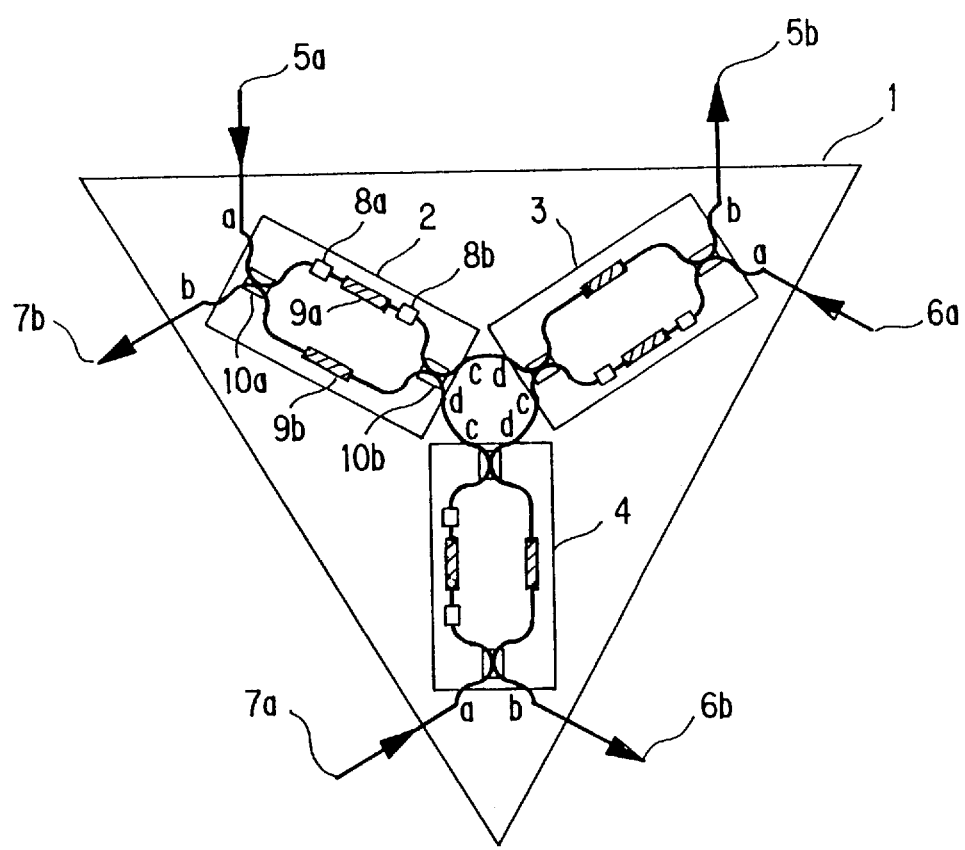
FIG. 1 is a block diagram showing Embodiment 1 according to the present invention.

Configuration of the present embodiment is shown in FIG. 1. In this figure, designated at the reference numeral 1 is an optical branch circuit, at 2, 3, 4 an optical filter respectively, at 8a, 8b a refractive index adjusting section respectively, at 9a, 9b a fiber grating as a wavelength selective reflector, at 10a, 10b a 3-dB coupler as a directional coupler. The signs a, b indicate a terminal in the front stage of the 3-dB coupler 10a, and the signs c, d indicate a terminal in the rear stage of the 3-dB coupler 10b. The optical filters 2, 3, 4 each are the same as the optical filter described in Example 2 of the conventional technology. The 3-dB coupler at an edge of the array comprising the three optical filter is connected to a 3-dB coupler of the adjacent optical filter.

Concretely, as shown in FIG. 1, a terminal c of the optical filter 2 is connected to a terminal d of the optical filter 3, a terminal c of the optical filter 3 to a terminal d of the optical filter 4, and furthermore a terminal c of the optical filter 4 to a terminal d of the optical filter 2. Also the terminal a, b in the front stage of the 3-dB coupler in each of the three optical filters 2, 3, 4 are connected, as shown in FIG. 1, to the I/O optical fibers 5a, 5b, 6a, 6b, 7a, 7b respectively to the optical branch circuit. It should be noted that a Bragg's wavelength of the fiber grating provided in each of the optical filters 2, 3, and 4 is $\lambda 1$.

For instance, a light wave having a wavelength of $\lambda 1$ introduced from the optical fiber 5a comes in from the terminal a of the optical filter 2, is reflected by the fiber gratings 9a and 9b, passes through the terminal b, and goes into the optical fiber 7b. In other words path setting from the optical fiber 5a to the optical fiber 7b is automatically executed according to the wavelength of $\lambda 1$.

Light waves each introduced from the terminal a of the optical filter 2 and having a wavelength other than $\lambda 1$ are not reflected by the fiber gratings 9a and 9b, and are sent to the terminal d. Then the light waves go into the terminal c of the optical filter 4, but are not reflected here, pass through the terminal b, and go into the optical fiber 6b. Namely the path from the optical fiber 5a to 6b is automatically set for a light wave having a wavelength other than $\lambda 1$.

Similarly the light wave coming in from the optical fiber 6a and having a wavelength of $\lambda 1$ is reflected by the optical filter 3 and goes into the optical fiber 5b, while all the light waves each coming in from the optical fiber 6a and having a wavelength other than $\lambda 1$ go into the optical fiber 7b. Furthermore the light wave coming in from the optical fiber 7a and having a wavelength of $\lambda 1$ is reflected by the optical filter 4 and goes into the optical fiber 6b, while all the light waves each coming in from the optical fiber 7a and having a wavelength other than $\lambda 1$ go into the optical fiber 5b. Of the light waves each coming in from the optical fiber 5a and having a wavelength of $\lambda 1$, all of a few components not reflected by the fiber grating and passing therethrough go to the optical filter 4. At the optical filter 4, most of the components are reflected and go to the optical filter 3. Most of the components having reached the optical filter 3 are reflected here and again go to the optical filter 2. Actually the components disappear due to loss generated in these steps and a crosstalk to other path never occurs.

On the other hand, of the light waves each coming in from the optical fiber 5a and having a wavelength other than $\lambda 1$, a few components go to the terminal c, and the components go to the terminal a of the optical filter 3. Namely the components go in a direction reverse to that in which other signals go through the optical fiber 6a, so that crosstalk with other signals never occurs.

As described above, different from a dielectric multilayered film filter which is required to be coupled to a bulk element in a space by using a conventional type of lens or the like, in the present invention, by connecting 3 pieces of optical filter each comprising two 3-dB couplers and 2 gratings into a star-shaped form, all the optical filters can be connected with an optical fiber, which makes it possible to realize an optical branch circuit with a small insertion loss as well as high reliability in which crosstalk rarely occurs.

It should be noted that description of the embodiment above assumes the configuration in which a fiber grating is used as a wavelength selective reflector, but the same effect can be obtained also by using a grating wave guide path formed on a flat optical substrate. Also the description above assumes use of a 3-dB coupler as a directional coupler, but other types of directional coupler may be used.

Figure 2:
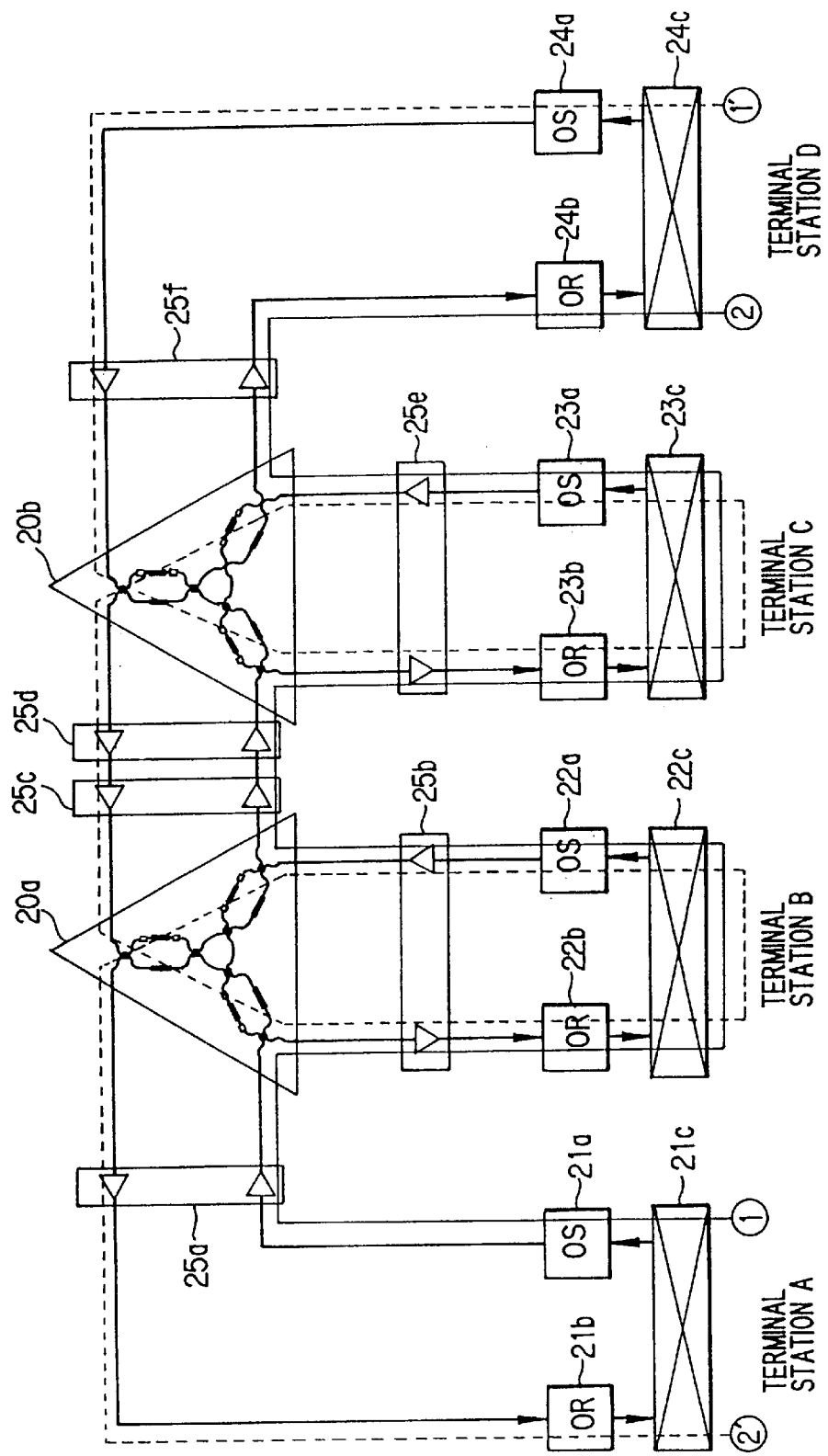
FIG. 2 is a block diagram showing Embodiment 2 according to the present invention.

An object of the present embodiment is to provide a method of constructing a wavelength multiplexed light communication system by using the optical branch circuit described in Embodiment 1. FIG. 2 is a network in which terminal stations A, B, C, and D each provided in each of 4 positions are connected to each other through the optical branch circuit. For instance, communications from the terminal station A to the terminal station D is executed along a path with a solid line indicated with 1 to 1'. At first, a signal transmitted with a wavelength of λ1 from a light transmitter 21a in the terminal station A is sent to an optical branch circuit 20a through an optical relay 25a. The wavelength of λ1 is reflected here, goes to an optical relay 25b, and is received by a light receiver 22b in the terminal station B. The signal for the terminal station B is allocated thereto by a cross-connector 22c, and the remained signals for terminal stations C, D are transmitted from a light receiver 22a thereto through the same wavelength of λ1. The signals transmitted from the optical relay 25b are again reflected by the optical branch circuit 20a and reach the optical branch circuit 20b through optical relays 25c, 25d. These signals are instantly reflected here, and received by a light receiver 23b in the terminal station C. A signal for the terminal station C is allocated thereto by a cross-connector 23c, and the remained signal for the terminal station D is transmitted from a light transmitter 23a thereto with the same wavelength of λ1. The signal transmitted from an optical relay 25e is again reflected by the optical branch circuit 20b and is received by a light receiver 24b in the terminal station D through an optical relay 25f.

Reversely, communications from the terminal station D to the terminal station A is executed along a path with a dotted line indicated with 2 to 2'. At first, a signal transmitted with a wavelength of λ2 from a light transmitter 24a in the terminal station D is sent to an optical branch circuit 20b through the optical relay 25f. The wavelength of λ2 passes through the circuit, goes to the optical relay 25e, and is received by the light receiver 23b in the terminal station C. The signal for the terminal station C is allocated thereto by the cross-connector 23c, and the remained signals for terminal stations B, A are transmitted from the light receiver 23a thereto through the same wavelength of λ2. The signals transmitted from the optical relay 25e again pass through the optical branch circuit 20b and reach the optical branch circuit 20a through optical relays 25d, 25c. These signals pass here, and are received by the light receiver 22b in the terminal station B. A signal for the terminal station B is allocated thereto by the cross-connector 22c, and the remained signal for the terminal station A is transmitted from a light transmitter 22a thereto with the same wavelength of λ2. The signal transmitted from the optical relay 25b again passes through the optical branch circuit 20a and is received by the light receiver 21b in the terminal station A through the optical relay 25a.

Figure 3:
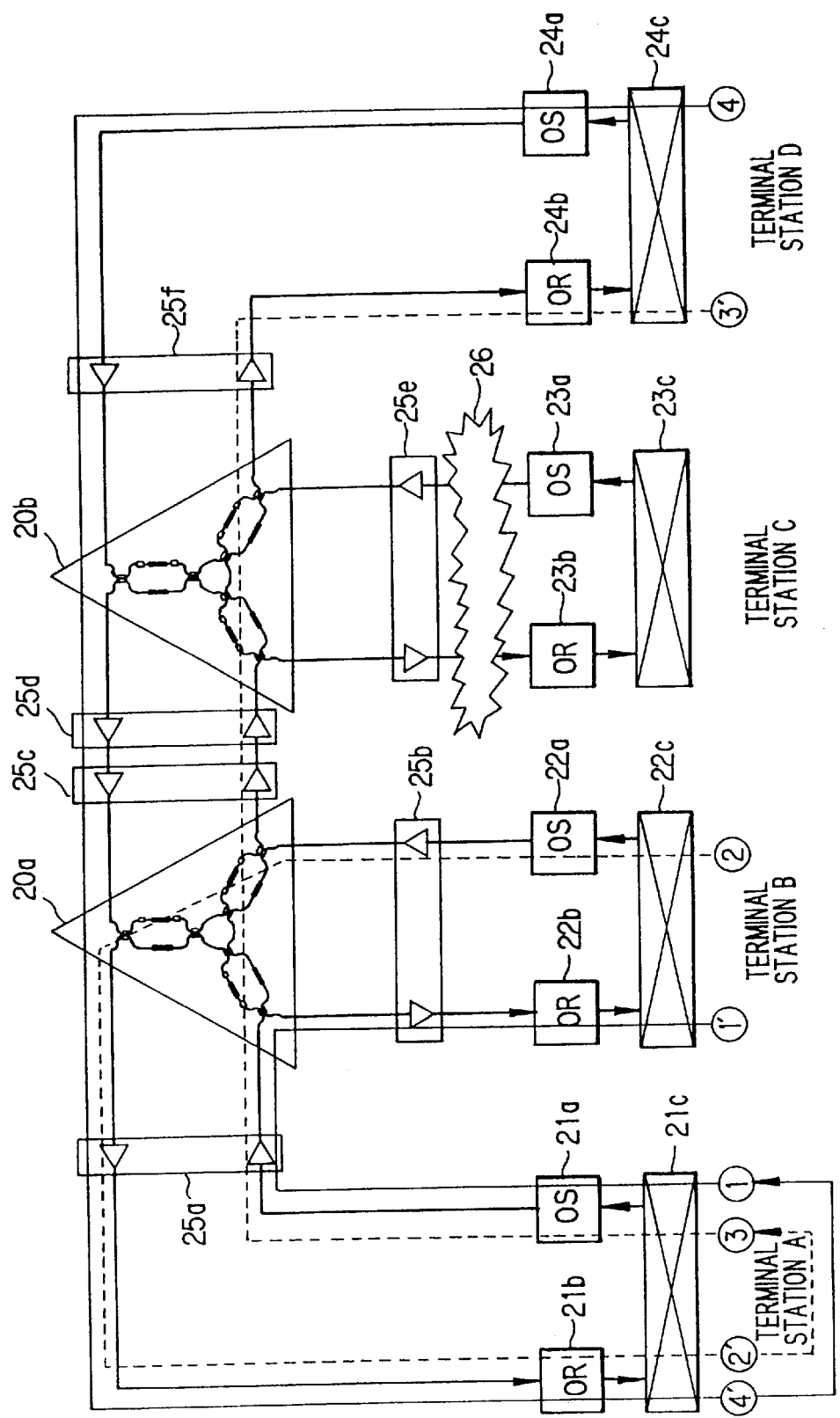
FIG. 3 is a block diagram showing operations in Embodiment 2 according to the present invention.

Next, a description is made for a case where some trouble that an optical cable between an optical branch circuit and the terminal station C is cut off is generated with reference to FIG. 3. The network has to immediately secure communication paths between the remained terminal stations without going through the terminal C.

At first, a monitoring function of the network catches the fact that the optical cable has been cut off at the troubled point 26. Communications from the terminal station A to the terminal station B is normally executed along the path indicated with a solid line 1 to 1' by using a wavelength of λ1. Communications from the terminal station A to the terminal station D can not pass through the terminal station C, so that a path indicated with a dotted line 3 to 3' is set by using a wavelength of λ2 from the terminal station A. On the other hand, the communications from the terminal station B to the terminal station D, at first, uses the wavelength of λ2, returns once to the terminal station A with the path indicated with a dotted line 2 to 2', and the signal is ridden onto the path indicated with the line 3 to 3' in the cross-connector 21c. Namely the signal is relayed at the terminal station A. Reversely to these steps, in the communications from the terminal station D to the station A, a path indicated with a solid line 4 to 4' is set by switching from the normal wavelength of λ2 to that of λ1. The communications from the terminal station D to that B can be achieved by switching to ride signals from 4' to 1 at the cross-connector 21c. As described above, all the communication paths except the terminal station C provided at the edge of the cable where the trouble has occurred can be secured only by switching a wavelength for transmission from a terminal station to a reflected wavelength (herein λ1) of the grating in an optical branch circuit or to a wavelength other than that described above (herein λ2).

The description above assumes an example in which 2 optical branch circuits are connected to each other, but even if 3 or more optical branch circuits are connected in series to each other, the terminal stations can similarly be communicated to each other.

An object of the present embodiment is to realize an optical branch circuit which branches a wavelength multiplexed light coming from one direction to two directions by using a wavelength selective reflector and a directional coupler, like that in Embodiment 1. In Embodiment 1, a transfer of a signal in a counterclockwise direction (e.g. 5a to 7b, 6a to 5b, 7a to 6b in FIG. 1) is executed by reflecting it by a fiber grating, and a transfer of a signal in a clockwise direction (e.g. 5a to 6b, 6a to 7b, 7a to 5b) is executed by passing through according to a Mach-Zehnder interferometer. Generally, a band width of a Bragg's reflected wavelength is narrower than transmission band width of the Mach-Zehnder interferometer, so that a number of transferring wavelengths in the counterclockwise direction has been limited. On the other hand, in Embodiment 3, transmission according to the Mach-Zehnder interferometer can be used for the transfer of a signal in a counterclockwise direction, and for this reason many numbers of wavelength can be allocated.

Figure 4:
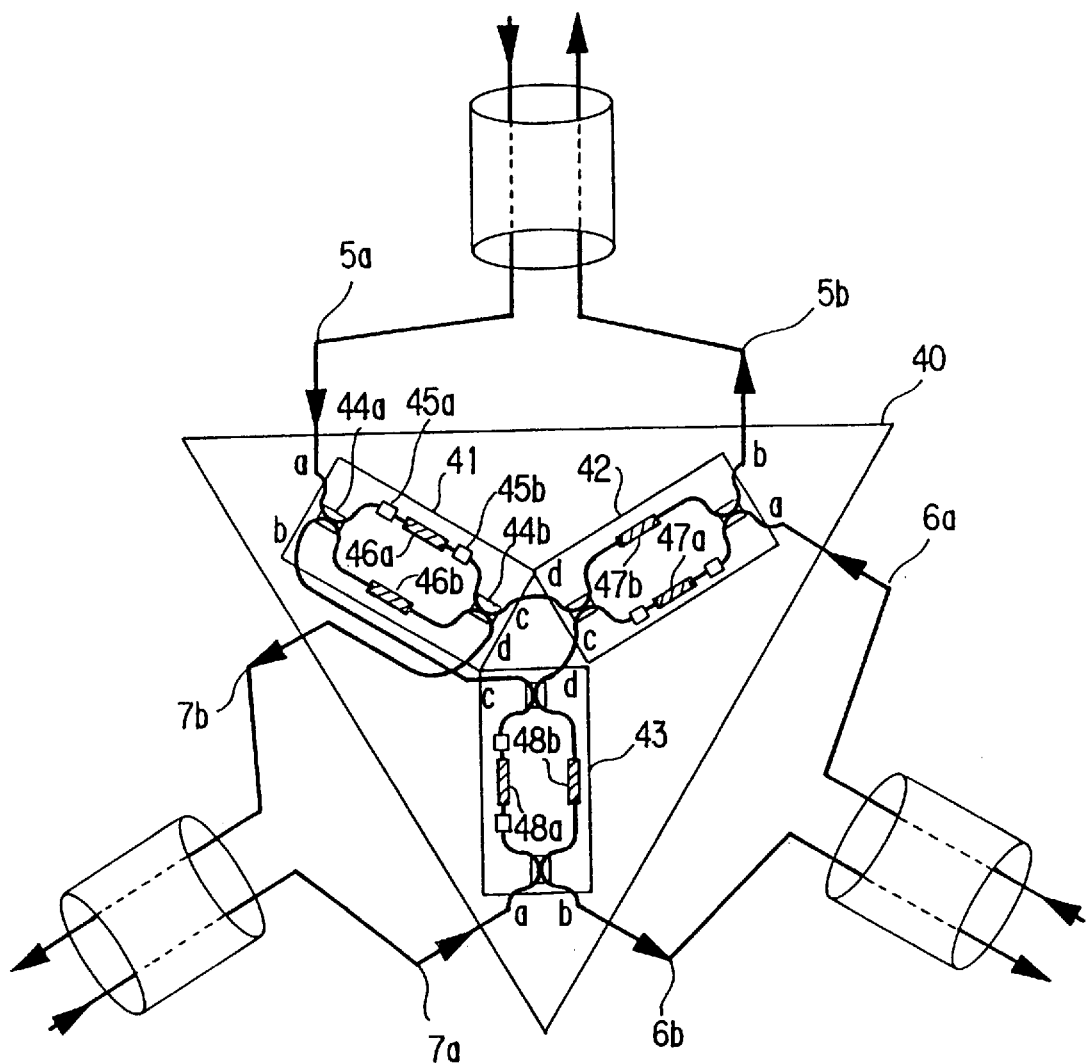
FIG. 4 is a block diagram showing Embodiment 3 according to the present invention.

Configuration of the present embodiment is shown in FIG. 4. In this figure, designated at the reference numeral 40 is an optical branch circuit according to the present invention, at 41, 42, 43 an optical filter respectively, at 44a, 44b a 3-dB coupler as a directional coupler, at 45a, 45b a refractive index adjusting section respectively, at 46a, 46b, 47a, 47b, 48a, 48b a fiber grating as a wavelength selective reflector respectively. The signs a, b indicate a terminal in the front stage of the 3-dB coupler 44a, and the signs c, d indicate a terminal in the rear stage of the 3-dB coupler 44b. The optical filters 41, 42, 43 each are the same as the optical filter described in Example 2 of the conventional technology. Concretely, as shown in FIG. 4, a terminal c of the optical filter 41 is connected to a terminal d of the optical filter 42, a terminal c of the optical filter 42 to a terminal d of the optical filter 43, and furthermore the terminal c of the optical filter 43 to the terminal d of the optical filter 41. The terminal a in the front stage of the 3-dB coupler in each of the three optical filter 41, 42, 43 are connected to the input optical fibers 5a, 6a, 7a, respectively to the optical branch circuit. Also the terminal d in the rear stage of the 3-dB coupler in the optical filter 41 is connected to the output optical fiber 7b. Furthermore the terminal b in the front stage of the 3-dB coupler in each of the optical filters 42, 43 is connected to the output optical fibers 5b, 6b from the optical branch circuit. It should be noted that a Bragg's wavelength of the fiber gratings 46a, 46b provided in the optical filter 41 is $\lambda 1$, and a Bragg's wavelength of the fiber grating provided in the optical filters 42 and 43 is $\lambda 2$.

For instance, a light wave having a wavelength of $\lambda 1$ introduced from the optical fiber 5a comes in from the terminal a of the optical filter 41, is reflected by the fiber grating, passes through the terminal b, and goes into the terminal c of the optical filter 43. The wavelength is not reflected here and sent from the terminal to the optical fiber 6b. In other words path setting from the optical fiber 5a to the optical fiber 6b is automatically executed according to the wavelength of $\lambda 1$. On the other hand, light waves coming in from the optical fiber 5a and having a wavelength other than $\lambda 1$ (including $\lambda 2$) come in from the terminal a of the optical filter 41, not reflected by the fiber grating, pass through the terminal d, and go to the optical fiber 7b through the terminal d. Namely, path setting from the optical fiber 5a to the optical fiber 7b is automatically executed according to the wavelength other than $\lambda 1$.

Light waves each introduced from the terminal a of the optical filter 42 and having a wavelength of $\lambda 2$ are reflected by the fiber grating, and are sent to the terminal b. In other words with the wavelength of $\lambda 2$, path setting from the optical fiber 6a to the optical fiber 5b is executed. On the other hand, the light waves coming in from the terminal a of the optical filter 42 and having a wavelength other than $\lambda 2$ are not reflected by the fiber grating and go to the terminal d. Then the light waves go into the terminal c of the optical filter 41, but the light waves having a wavelength of $\lambda 1$ are reflected here, pass through the terminal d, and go into the optical fiber 7b. Namely the path from the optical fiber 6a to 7b is set for a light wave having a wavelength of $\lambda 1$.

Similarly the light wave coming in from the terminal a of the optical filter 43 and having a wavelength of $\lambda 2$ is reflected by the fiber grating and goes into the terminal b. Namely, the path from the optical fiber 7a to 6b is set for a light wave having a wavelength of $\lambda 2$. On the other hand, the light waves coming in from the terminal a of the optical filter 43 and having a wavelength other than $\lambda 2$ are not reflected by the fiber grating and go to the terminal d. Then the light waves go into the terminal c of the optical filter 42, but the light waves having a wavelength of $\lambda 1$ are not reflected here, pass through the terminal b, and go into the optical fiber 5b. Namely the path from the optical fiber 7a to 5b is set for a light wave having a wavelength of $\lambda 1$.

The optical fiber cable connected to the optical fiber 5a, 5b and the optical fiber cable connected to the optical fibers 7a, 7b are trunk transfer path having a large capacity, and the optical fiber cable connected to the optical fibers 6a, 6b can be a branch for dropping and adding. Many types of wavelengths other than $\lambda 1$ can be used for the path from the optical fibers 5a to 7b. Also many types of wavelengths other than $\lambda 2$ can be used for the path from the optical fibers 7a to 5b. Accordingly, an optical branch circuit advantageous to its large capacity can be formed in the system in which the paths from the optical fibers 5a to 7b, and 7a to 5b each are up/down of the trunk transfer path. Also the wavelength of $\lambda 1$ is used for the dropping path to the optical fiber 5a to 6b, and the wavelength of $\lambda 2$ is used for the dropping path to the optical fiber 7a to 6b, so that it is possible to realize a function of multiplexing wavelengths dropped from both of up- and down-trunk transfer paths. On the other hand it is possible to realize a function of separating added wavelengths from the optical fiber 6a to both of the up- and down-trunk transfer path.

It should be noted that description of the embodiment above assumes the configuration in which a fiber grating is used as a wavelength selective reflector, but the same effect can be obtained also by using a grating wave guide path formed on a flat optical substrate. Also the description above assumes use of a 3-dB coupler as a directional coupler, but other types of directional coupler may be used.

Figure 5:
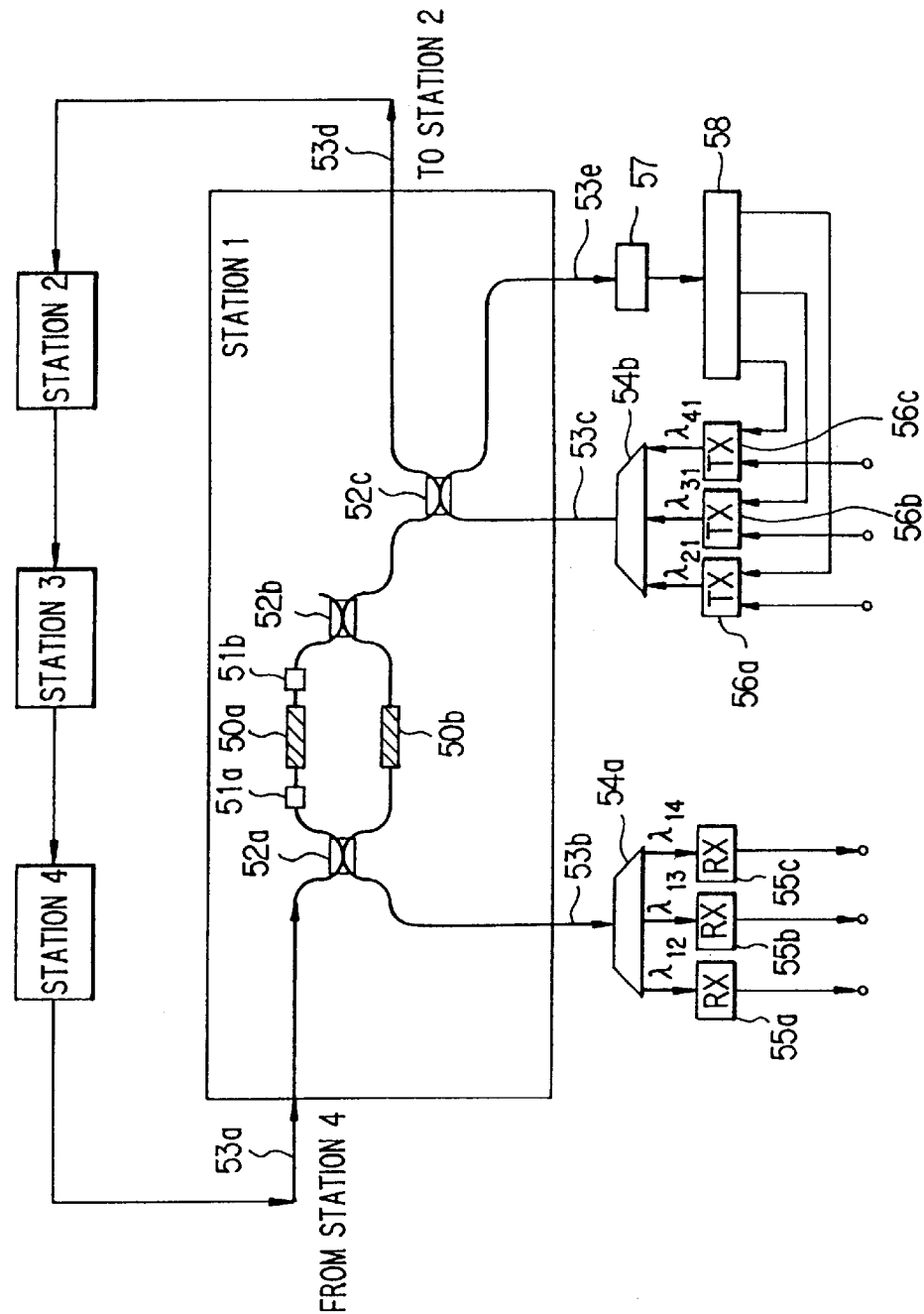
FIG. 5 is a block diagram showing Embodiment 4 according to the present invention.

An object of the present invention is to provide an optical dropping/adding circuit which enables a plurality of stations connected to each other in a ring-shaped form to communicate with any of other stations simultaneously. FIG. 5 shows configuration of one station in the present embodiment. In this figure, designated at the reference numerals 56a, 56b, and 56c is a light transmitter respectively, at 55a, 55b, 55c is a light receiver, at 52a, 52b a 3-dB coupler, at 54a, 54b a wave synthesizer/divider, at 52c a 10 vs 1 coupler, at 50a, 50b a fiber grating for a light wave having a Bragg's wavelength of $\lambda B1$, at 51a, 51b a refractive index adjusting section, at 53a ga light transfer path input terminal, at 53b a dropping terminal, at 53c an adding terminal, at 53d a light transfer path output terminal, at 53e a dropping terminal, at 57 a wavelength monitoring device, and at 58 a wavelength and output level adjusting circuit.

Next, a case is described in which transmission wavelengths and receiving wavelengths are allocated to N stations.

Figure 6:
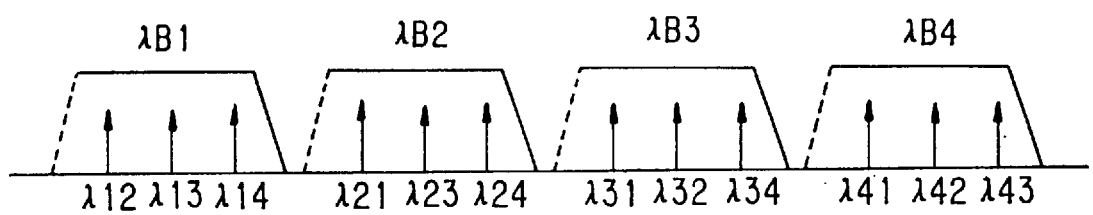
FIG. 6 is a view showing a wavelength allocated to each station according to the present invention.

A group of wavelengths are allocated to each station, and each wavelength is subdivided and allocated to each of other N-1 stations. An example of wavelength allocation in a case where N is equal to 4 is shown in FIG. 6. A group of wavelength $\lambda Bi$ is allocated as a wavelength to a station i. Of the wavelengths, to differentiate a transmitting station, the wavelengths are subdivided. For instance, in a case of the wavelength of $\lambda B1$, a wavelength of $\lambda 12$ is allocated to communications from the station 2 to the station 1. Similarly the wavelength of $\lambda 13$ is allocated to the communications from the station 3 to the station 1, and a wavelength of $\lambda 14$ to communications from the station 4 to the station 1 with the wavelengths of $\lambda B12, \lambda B13, \lambda B14$ allocated to inside of a band of the Bragg's wavelength $\lambda B$ 1.

Figures 7, 8:
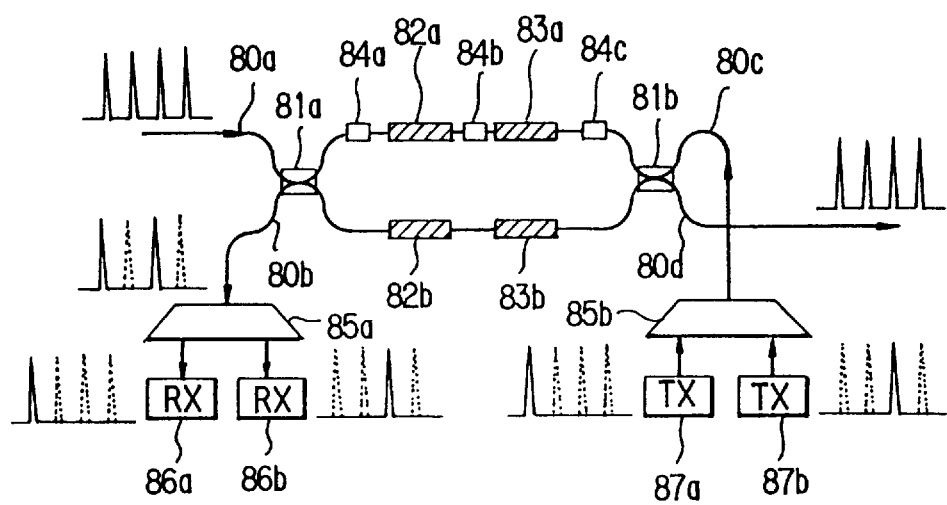
FIG. 7 is a view showing a wavelength allocated to a transmitting station and a receiving station.
FIG. 8 is a block diagram showing Embodiment 5 according to the present invention.

On the other hand, the wavelength of $\lambda 31$ in a wavelength group $\lambda B$ 3 is allocated, for instance, to the communication from the station 1 to the station 3. Combinations of wavelength allocation are shown in FIG. 7.

Next, a description is made for operations in the station 1 with reference to FIG. 5.

As a Bragg's wavelength of the fiber gratings 50a, 50b is $\lambda B1$, of the WDM signals coming in from the light transfer path input terminal 53a, all the light waves each having a wavelength for the station 1 are reflected there and are dropped to the terminal 53b. The light waves each dropped there and having a wavelength for the station 1 are divided to several groups of light waves each having a specific wavelength by the wave divider/synthesizer 54a and are received by the light receivers 55a, 55b, and 55c. On the other hand, adding light waves transmitted from the light transmitters 56a, 56b, 56c in the station 1 to other stations are inserted from the 10 vs 1 coupler 52*c* not having the wavelength selectivity, and are outputted to the light transfer path output terminal 53*d*. To compensate the insertion loss of 10 dB here, sometimes the adding light waves may previously be amplified by a booster amplifier.

As a level difference may be generated during transfer between light waves each having a specific wavelength or displacement from a specified wavelength may be generated, the wavelength monitoring device 57 monitors each wavelength, and generates an alarm signal according to a type of fault. The wavelength and output level adjusting circuit 58 which received the alarm controls a level or a wavelength of the adding light waves having added wavelengths of λ21, λ31, and λ41 to its correct value.

It is needless to say that either a 9 vs 1 coupler or a 20 vs 1 coupler may be used as the 10 vs 1 coupler 52 so long as it can add a light wave at the same level as that of other WDM signals. Although description of the embodiment above assumes use of 4 light waves, but the same effect can be achieved by any number (N) of light waves.

As described above, an optical dropping/adding circuit, which allocates specific wavelengths for receiving and transmission in each station, is provided, so that optical communication can be made with any station.

It should be noted that, although the above description assumes use of a fiber grating as a wavelength selective reflector, the same effect can be achieved also by using a grating wave guide path formed on a flat optical substrate. Also the above description assumes use of a 3-dB coupler as a directional coupler, but the coupler is not always limited to the 3-dB coupler.

An object of the present embodiment is to drop and add desired two types of light wave from the WDM light waves. FIG. 8 shows configuration of this embodiment. In this figure, designated at the reference numeral 87*a* is a light transmitter for a light wave having a wavelength of λi, 87*b* a light transmitter for a light wave having a wavelength of λj, at 86*a* a light receiver for receiving a light wave having a wavelength of λi, at 86*b* a light receiver for receiving a light wave having a wavelength of λj, at 81*a*, 81*b* a 3-dB coupler respectively, at 85*a*, 85*b* an optical divider/synthesizer, at 82*a*, 82*b* a fiber grating for a light wave having a Bragg's wavelength of λi respectively, at 83*a*, 83*b* a fiber grating for a light wave having a Bragg's wavelength of λj, at 84*a*, 84*b*, 84*c* a refractive index adjusting section respectively, at 80*a* a light transfer path input terminal, at 80*b* a dropping terminal, at 80*c* an adding terminal, and at 80*d* a light transfer path output terminal.

Next, a description is made for operations in this embodiment with reference to FIG. 8. Of the WDM light waves coming in from the light transfer path input terminal 80*a*, those having a wavelength of λi are reflected by the fiber gratings 82*a* and 82*b* and again return to the 3-dB coupler 81*a*. As adjustment is provided by the refractive index adjusting section 84*a* so that a length of a light path from the 3-dB coupler 81*a* to the fiber grating 82*a* will be identical to that from the 3-dB coupler 81*a* to the fiber grating 82*b*, so that a phase of a light wave having a wavelength of λi becomes reverse and is sent to the dropping terminal 80*b*. Of the WDM light waves coming in from the light transfer path input terminal 80*a*, light waves having a wavelength of λj are reflected by the fiber gratings 83*a* and 83*b*, and again return to the 3-dB coupler 81*a*. Adjustment is executed by the refractive index adjusting section 84*b* so that a length of a light path from the 3-dB coupler 81*a* to the fiber grating 83*a* will be identical to that from the 3-dB coupler 81*a* to the fiber grating 83*b*, so that a phase of the light wave having a wavelength of λj becomes reverse and the light wave is sent to the dropping terminal 80*b*. The light wave sent to the dropping terminal 80*b* and having a wavelength of λi and that having a wavelength of λj are separated from each other by the optical divider/synthesizer 85*a* and are received by the light receivers 86*a* and 86*b*.

Light waves generated from the light transmitters 87*a* and 87*b* and having wavelengths of λi and λj are synthesized by the optical divider/synthesizer 85*b* and are added from the adding terminal 80*c* to the 3-dB coupler 81*b*. The light wave having a wavelength of λi is reflected by the fiber gratings 82*a* and 82*b* and again returns to the 3-dB coupler 81*b*. Adjustment is executed by the refractive index adjusting section 84*b* so that a length of a light path from the 3-dB coupler 81*b* to the fiber grating 82*a* will be identical to that from the 3-dB coupler 81*b* to the fiber grating 82*b*, so that a phase of the light wave having a wavelength of λi becomes reverse and is sent to the light transfer path output terminal 80*d*. The light wave having a wavelength of λj is reflected by the fiber gratings 83*a* and 83*b* and again returns to the 3-dB coupler 81*b*. Also adjustment is provided by the refractive index adjusting section 84*c* so that a length of a light path from the 3-dB coupler 81*b* to the fiber grating 83*a* will be identical to that from the 3-dB coupler 81*b* to the fiber grating 83*b*, so that a phase of the light wave having a wavelength of λj becomes reverse and is sent to the light transfer path output terminal 80*d*.

Figure 9A:
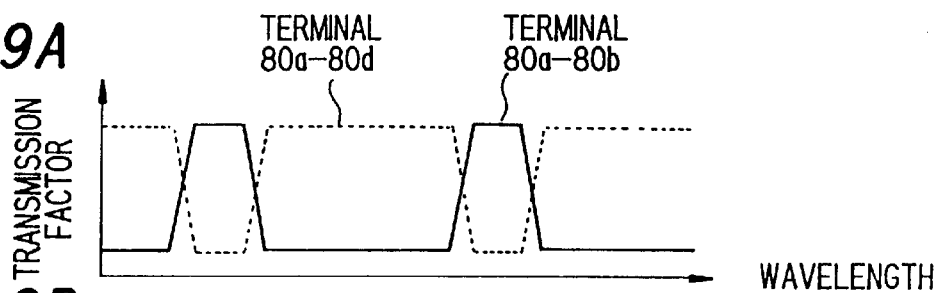
FIG. 9 is a view showing transmittance when two types of wavelength are dropped and added.
Figure 9B:
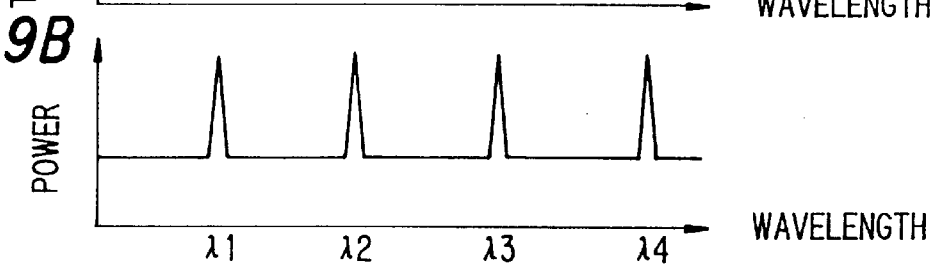

The wavelength characteristics is shown in FIG. 9. The solid line shown in FIG. 9A indicates the transmission characteristics of a light wave having a wavelength to be dropped from the light transfer path input terminal 80*a* to the dropping terminal 80*b*. The dotted line in FIG. 9A indicates the transmission characteristics of a light wave having a wavelength to be sent from the light transfer path input terminal 80*a* to the light transfer path output terminal 80*d*. An example of wavelength allocation is shown at FIG. 9B. Herein i indicates 1 and j indicates 3.

As described above, a plurality of gratings are connected in series between two 3-dB couplers, so that a plurality types of light waves each having a specific wavelength can simultaneously be dropped and added.

Also the description above assumes use of two types of light wave each having a specific wavelength, but the same effect can be achieved by using 3 or more types of wavelength.

Also the above description assumes use of a fiber grating as a wavelength selective reflector, but the same effect can be achieved also by using a grating wave guide path formed on a flat optical substrate. Also the above description assumes use of a 3-dB coupler as a directional coupler, but a coupler available in this embodiment is not always limited to a 3-dB coupler.

An object of the present embodiment is to drop and add desired number of light waves from the WDM light waves like in Embodiment 5.

Figure 10:
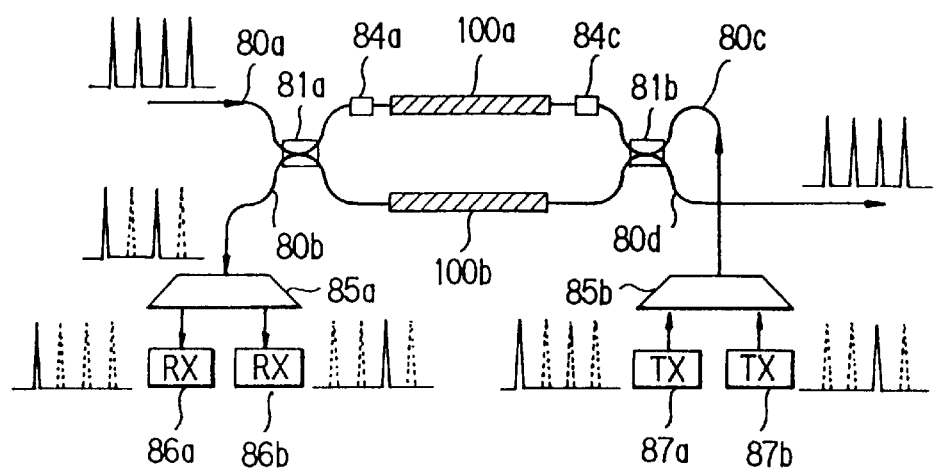
FIG. 10 is a block diagram showing Embodiment 6 according to the present invention.

FIG. 10 shows configuration of this embodiment. In this figure, designated at the reference numeral 87*a* is a light transmitter for a light wave having a wavelength of λi, at 87*b* a light transmitter for a light wave having a wavelength of λj, at 86*a* a light receiver for receiving a light wave having a wavelength of λi, at 86*b* a light receiver for receiving a light wave having a wavelength of λj, at 81*a*, 81*b* a 3-dB coupler respectively, at 85*a*, 85*b* an optical divider/synthesizer, at 100*a*, 100*b* a fiber grating for a light wave formed by overlapping Bragg's wavelengths of λi and λj respectively, at 84*a*, 84*b* a refractive index adjusting section, at 80*a* a light transfer path input terminal, at 80*b* a dropping terminal, at 80*c* an adding terminal, and at 80*d* a light transfer path output terminal.

A case where a phase mask is used for manufacturing fiber gratings 100*a*, 100*b* is described in FIG. 11. There is a relation of $\lambda B=\Lambda/neff$ between a pitch $\Lambda$ of a phase mask and a formed light wave having a Bragg's wavelength of $\lambda B$. Herein neff indicates an effectively refractive index of a fiber. In a first stage, a Bragg's grating of a light wave having a Bragg's reflection wavelength $\lambda i$ is formed by using a phase mask having a pitch of $\Lambda i=\lambda i/neff$. In a second stage, a Bragg's grating of a light wave having a Bragg's reflection wavelength $\lambda j$ is overlapped and depicted by using a phase mask having a pitch of $\lambda j=\lambda j/neff$. As a result, a grating having two lines of reflection peak as shown in FIG. 12 can be formed.

Next description is made for operations in this embodiment with reference to FIG. 10. Of the WDM light waves coming in from the light transfer path input terminal 80*a*, those having wavelengths of $\lambda i$ and $\lambda j$ are reflected by the fiber gratings 100*a* and 100*b* and again return to the 3-dB coupler 81*a*. Adjustment is provided by the refractive index adjusting section 84*a* so that a length of a light path from the 3-dB coupler 81*a* to the fiber grating 100*a* will be identical to that from the 3-dB coupler 81*a* to the fiber grating 100*b*, so that a phase of a light wave having a wavelength of $\lambda i$ is reverse to that having a wavelength of $\lambda j$ and are sent to the dropping terminal 80*b*. The light waves sent to the dropping terminal 80*b* and having a wavelength of $\lambda i$ and that having a wavelength of $\lambda j$ are separated from each other by the optical divider/synthesizer 85*a* and are received by the light receivers 86*a* and 86*b*.

Light waves generated from the light transmitters 87*a* and 87*b* and having wavelengths of $\lambda i$ and $\lambda j$ are synthesized by the optical divider/synthesizer 85*b* and are added from the adding terminal 80*c* to the 3-dB coupler 81*b*. The light waves having wavelengths of $\lambda i$ and $\lambda j$ are reflected by the fiber gratings 100*a* and 100*b* and again return to the 3-dB coupler 81*b*. Adjustment is executed by the refractive index adjusting section 84*c* so that a length of a light path from the 3-dB coupler 81*b* to the fiber grating 100*a* will be identical to that from the 3-dB coupler 81*b* to the fiber grating 100*b*, so that a phase of the light wave having a wavelength of $\lambda i$ becomes reverse to that having a wavelength of $\lambda j$ and are sent to the light transfer path output terminal 80*d*.

In Embodiment 5, a plurality of gratings are connected in series between two 3-dB couplers, so that a plurality types of light waves each having a specific wavelength can simultaneously be dropped and added, but in this embodiment, gratings having a plurality types of light waves each having a Bragg's reflective wavelength are arranged physically in the same position, which makes it possible to reduce the number of refractive index adjusting sections and to easily adjust a length of a light path between the grating and a 3-dB coupler.

Also the description above assumes use of two types of light wave each having a specific wavelength, but the same effect can be achieved by using 2 or more types of wavelength. Also the description above assumes manufacture of a grating by using two different types of phase masks, but a plurality of grating pitches which are previously formed on one phase mask may be used.

Also the above description assumes use of a fiber grating as a wavelength selective reflector, but the same effect can be achieved also by using a grating wave guide path formed on a flat optical substrate. Also the above description assumes use of a 3-dB coupler as a directional coupler, but a coupler available in this embodiment is not always limited to a 3-dB coupler.

An object of the present embodiment is to reduce the possibility of crosstalk from a light transmitter to a light receiver by displacing a wavelength for transmission against that for receiving.

Figure 13:
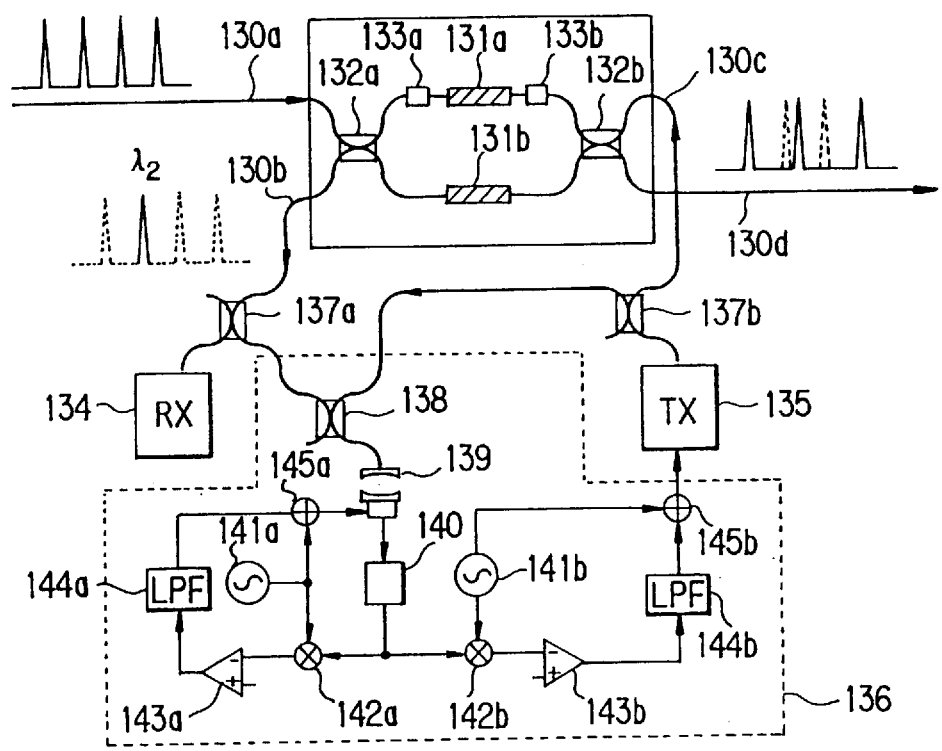
FIG. 13 is a block diagram showing Embodiment 7 according to the present invention.

Configuration of the present embodiment is shown in FIG. 13. In this figure, designated at the reference numerals 132*a*, 132*b* is a 3-dB coupler respectively, at 131*a*, 131*b* a fiber grating for a Bragg's wavelength of $\lambda 2$ respectively, at 133*a*, 133*b* a refractive index adjusting section respectively, at 130*a* a light transfer path input terminal, at 130*b* a dropping terminal, at 130*c* an adding terminal, at 130*d* a light transfer path output terminal, at 135 a light transmitter for transmitting a light wave (adding light) having a specified wavelength, at 134 a light receiver for receiving a light wave (dropping light) having a specified wavelength, at 136 an optical frequency control circuit for locking a wavelength of an adding light wave against a dropping light by giving an offset rate, and at 137*a*, 137*b* a 10 vs 1 coupler respectively.

Next, a description is made for operations in this embodiment. It is assumed herein that $\lambda 2$ is a Bragg's wavelength of the fiber gratings 131*a*, 131*b*. Of the WDM light waves coming in from the light transfer path input terminal 130*a*, light waves having a wavelength of $\lambda 2$ is dropped by the 3-dB coupler 132*a*, reflected by the fiber gratings 131*a*, 131*b*, and are sent to the dropping terminal 130*b*. Connected to the dropping terminal 131*b* is the light receiver 134 via the 10 vs 1 coupler 137*a*. Of the WDM light waves coming in from the light transfer path input terminal 131*a*, all the light waves each having a wavelength other than $\lambda 2$ pass therethrough to the light transfer path output terminal 130*d*. On the other hand, a light wave having a wavelength of $\lambda 2$ generated by the light transmitter 135 comes in from the dropping terminal 130*c*, is dropped by the 3-dB coupler 132*b*, reflected by the fiber gratings 131*a*, 131*b*, and sent to the light transfer path output terminal 130*d*.

Then a portion of the dropping light waves dropped to the dropping terminal 131*b* is partially distributed by the 10 vs 1 coupler 137*a* and inputted into the optical frequency control circuit 136. Also a portion of the adding light waves transmitted from the light transmitter 135 is distributed by the 10 vs 1 coupler 137*b* and is inputted into the optical frequency control circuit 136.

In the optical frequency control circuit 136 into which two types of light wave are inputted, a wavelength of a light wave generated by a laser diode provided in the light transmitter 135 is controlled so that a wavelength $\lambda 2$ of the dropping light waves is detected and at the same time a wavelength of the adding light wave is offset by $\Delta$ against a wavelength of the dropping light wave. Herein it is assumed that $\Delta$ is at least 2 times the transfer bit rate or more. As a result, a wavelength of the adding light wave becomes $\lambda 2 +\Delta$ or $\lambda 2 -\Delta$. To which of + or − the wavelength is to be displaced is automatically decided by the system.

In the embodiment described above, a wavelength of an adding light wave is offset and locked against a wavelength of a detected dropping light wave, but a system is allowable in which respective wavelength allocation is previously decided in a network and each wavelength is controlled through a monitor/control line. Also in that case, an offset of 2 times or more bit rate is given to the dropping light and an adding light in the same wavelength zone.

Next, description is made for configuration and operations of the optical frequency control circuit 136 with reference to FIG. 13. In this figure, designated at the reference numeral 138 is a 3-dB coupler, at 139 a sweeping type of Fabry Perot interferometer, at 140 a light receiver, at 141a an f1 sinusoidal wave oscillator, at 141b an f2 sinusoidal wave oscillator, at 142a, 142b a mixer respectively, at 143a, 143b a differential amplifier respectively, and at 144a, 144b a loop filter respectively. A portion of light waves each having a wavelength of λ2 dropped to the dropping terminal 131b is partially distributed by the 10 vs 1 coupler 137a and inputted via the 3-dB coupler 138 into the sweeping type of Fabry Perot interferometer 139. The sweeping type of Fabry Perot interferometer 139 is swept by an f1 sinusoidal wave generated from the oscillator 141a. The light wave having a wavelength of λ2 passing through the sweeping type of Fabry Perot interferometer 139 is converted by the light receiver 140 to an electric signal and is locked in f1 and detected by the mixer 142a. The obtained signal is compared by the differential amplifier 143a to the reference voltage, and an outputted error signal is fedback via a loop filter 144a to a bias signal in the sweeping type of Fabry Perot interferometer 139. After the processes described above, a transmission peak in the sweeping type of Fabry Perot interferometer 139 is locked to a wavelength peak of the received light wave having a wavelength of λ2.

On the other hand, a portion of the adding light waves generated from the light transmitter 135 is distributed by the 10 vs 1 coupler 137b and is sent via the 3-dB coupler 138 into the sweeping type of Fabry Perot interferometer 139. An f2 sinusoidal wave signal generated from the oscillator 141b is superimposed to a bias current in a laser diode incorporated in the light transmitter 135, and the optical frequency is subjected to minute FM modulation. The signal converted from FM to AM in the sweeping type of Fabry Perot interferometer 139 is locked in and detected by the mixer 142b. The obtained signal is compared in the differential amplifier 143b to the reference voltage, and an outputted error signal is fedback via the loop filter 144b to a bias signal in a laser diode incorporated in the light transmitter 135. After the processes described above, a wavelength for transmission in the light transmitter 135 is locked to a transmission peak of the sweeping type of Fabry Perot interferometer 139.

Figures 14A, 14B, 14C:
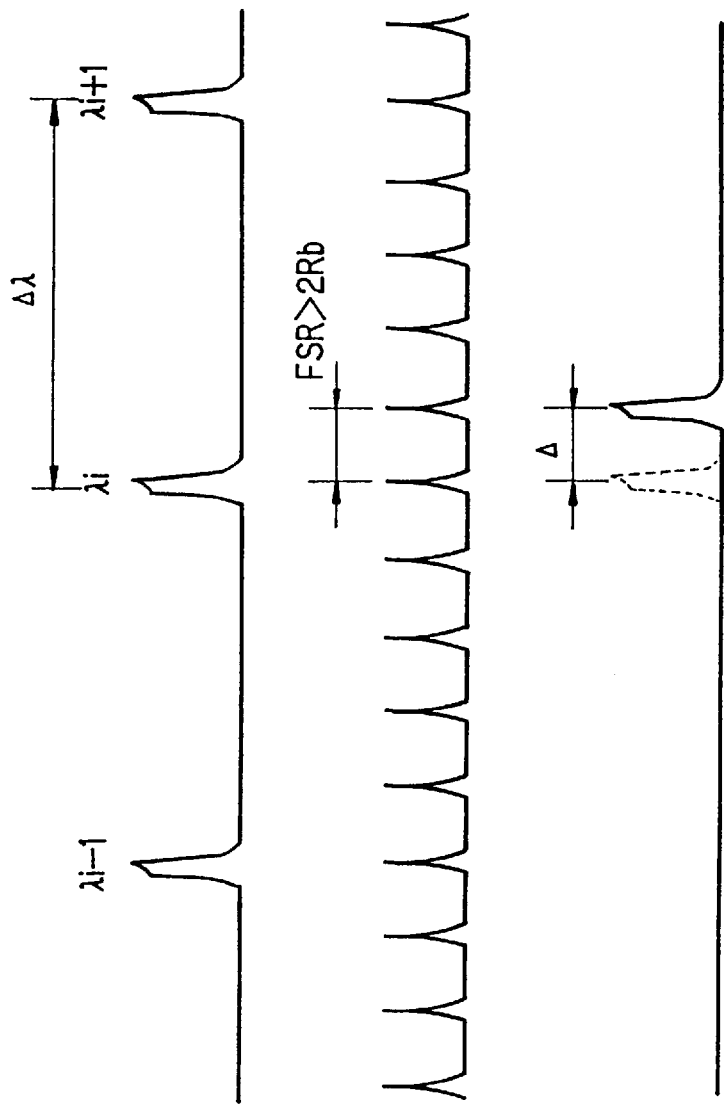
FIG. 14 is an arrangement view of a wavelength shown in Embodiment 7 according to the present invention.

Next description is made for a relation between the sweeping type of Fabry Perot interferometer 139 and the WDM light with reference to FIG. 14. In this figure, FIG. 14A shows a spectrum of the WDM light coming in from the terminal 130a. Herein it is assumed that a wavelength clearance is Δλ. FIG. 14B shows a cyclic transmission spectrum in the sweeping type of Fabry Perot interferometer 139. A clearance of transmission peak is called free spectrum range (FSR), and it is assumed herein that the FSR is 2 times the transfer bit rate Rb or more. In the example shown in this figure, 5 FSRs are inserted into a Δλ. As described above, one of the transmission peaks in the sweeping type of Fabry Perot interferometer 139 is locked to an i-th wavelength λi. FIG. 14C shows a spectrum of an adding light wave added from the light transmitter 135. In a case where no control is provided, sometimes the wavelength may become coincident to that of the dropping light wave as indicated by a dotted line in this figure. Even if not coincident, in a case where the wavelength is within a frequency range for the bit rate, a large power penalty due to crosstalk expressed by the expression (3) may be generated. On the other hand, if an offset lock control is provided so that the wavelengths are separated by 2 times of the bit rate or more as indicated by the solid line, a power penalty due to crosstalk can substantially be reduced because a wavelength of a transmitted light wave is largely displaced from that of a received light wave.

To recognize transmission peaks cyclically arrayed in the sweeping type of Fabry Perot interferometer 139, it is desirable that a monitoring/control system in a network independently monitors each wavelength in batch. Otherwise, a dropping light and an adding light may be locked to the same transmission peak, or may be locked to transmission peaks separated from each other by 2 or more.

Figure 15:
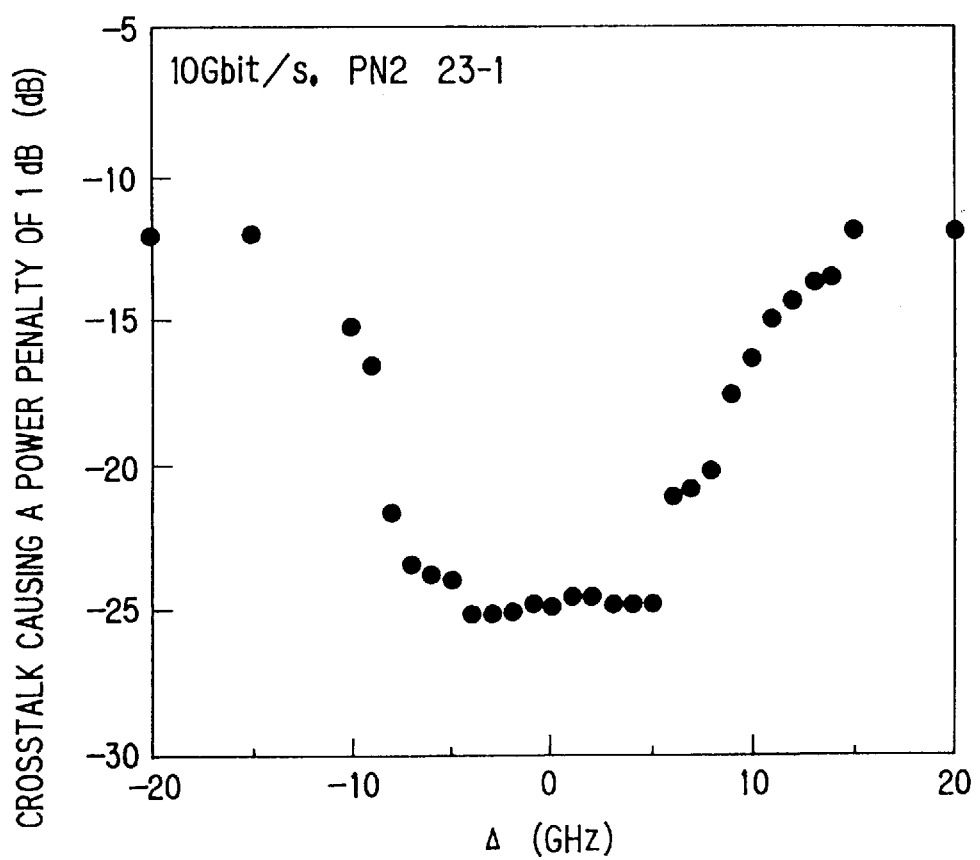
FIG. 15 is a view of experimental results for explaining an effect in Embodiment 7 according to the present invention.

FIG. 15 shows a result of measurement of the frequency of crosstalk causing a power penalty of 1 dB by changing the optical frequency difference between the dropped light ad the crosstalk light. The transfer bit rate is 10 Gbit/s. When the Δ is within +5 GHz, overlap of the power spectrum became maximum, and a penalty of 1 dB was generated for crosstalk of only −25 dB. When separated by 20 GHz or more (2 times of the transfer bit rate), the overlap could be ignored, and the power penalty was kept at a constant level. Namely by making the Δ large enough to ignore the overlap of power spectrum between a dropping light and a crosstalk light, a power penalty due to crosstalk can fully be suppressed to a low level. Assuming that the crosstalk is X, the power penalty PP then can be expressed by the following expression:

$$PP = -10 \log (1-X) \qquad (4)$$

The power penalty given by this expression is smaller than that given by the expression (3).

As another method of locking a transmission peak in the sweeping type of Fabry Perot interferometer 139 to a wavelength of a dropping light wave, also the same effect can be achieved by subjecting a dropping light to f1 minute frequency modulation with a oscillator in the transmission side and transferring a light wave having a frequency of f1 through a different monitoring/control line and also by locking in and detecting an error signal with the mixer 142a.

As described above, as the optical frequency control circuit separates a wavelength of an dropping light from that of an adding light by 2 times of a bit rate or more, even if crosstalk between two types of light wave occurs in an optical filter, a transfer penalty due to the phenomenon can be reduced.

Although the above description assumes use of a fiber grating as a wavelength selective reflector, the same effect can be achieved also by using a grating wave guide path formed on a flat optical substrate. Also the above description assumes use of a 3-dB coupler as a directional coupler, the coupler is not always limited to a 3-dB coupler.

An object of the present embodiment is to reduce a frequency of crosstalk by connecting two fiber gratings in series via a 3-dB coupler in a case where a dropping wavelength is identical to an adding wavelength.

Figure 16:
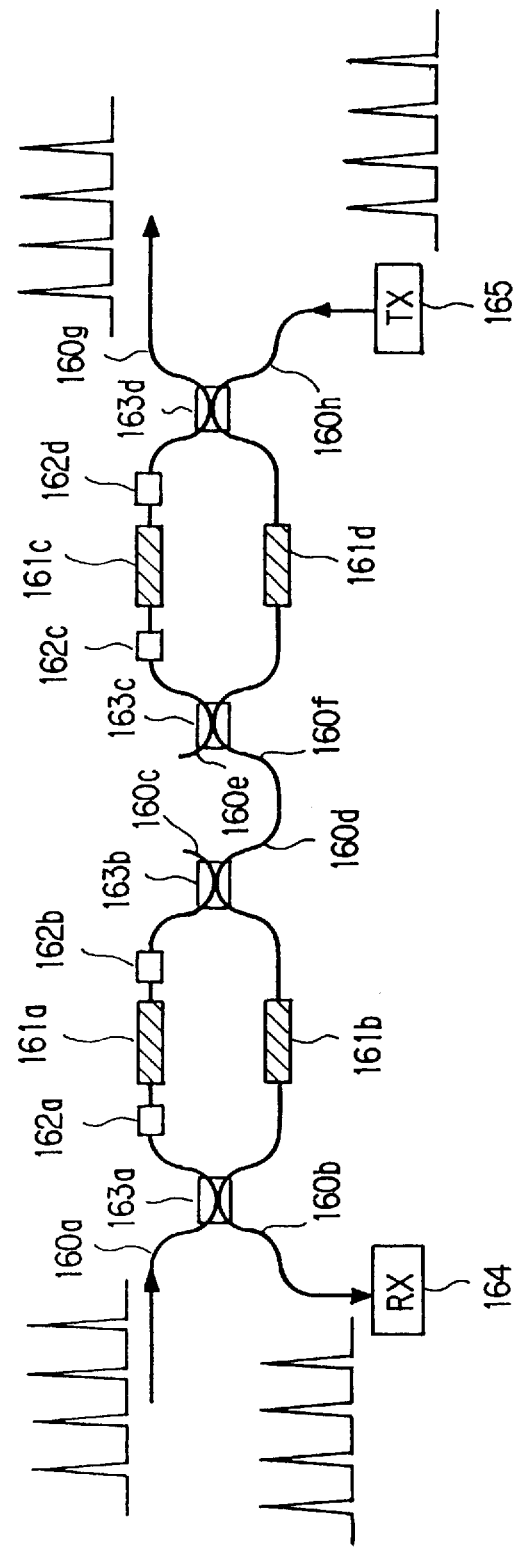
FIG. 16 is a block diagram showing Embodiment 8 according to the present invention.

FIG. 16 shows configuration of the present embodiment. In this figure, designated at the reference numeral 164 is a light receiver, at 165 a light transmitter, at 163a, 163b, 163c, 163d a 3-dB coupler respectively, at 161a, 161b, 161c, 161d a fiber grating having the same Bragg's wavelength of λ2 respectively, and at 162a, 162b, 162c, 162d a refractive index adjusting section respectively. Also designated at the reference numeral 160a is a light transfer path input terminal, at 160b a dropping terminal, at 160c, 160d a terminal in a rear stage of the 3-dB coupler 163b respectively, at 160e, 160f a terminal in a front stage of the 3-dB coupler 163c, at 160g a light transfer path output terminal, and at 160h an adding terminal.

Of the WDM light waves coming in from the light transfer path input terminal 160a, only light waves having a wavelength of λ2 are reflected by the fiber grating 161a, 161b and can be fetched out from the dropping terminal 160b of the 3-dB coupler 163a. The refractive index adjusting section 162a is provided so that a length of a light path from the 3-dB coupler 163a to the fiber grating 161a will be identical to that from the 3-dB coupler 163a to the fiber grating 161b. Light waves each having a wavelength other than λ2 and not reflected there reach the 3-dB coupler 163b, and a refractive index adjusting section 162b is provided herein so that a phase of reflected light will be reverse to that of not-reflected light. Namely all light waves each having a wavelength other than λ2 go out of the terminal 160d.

The light waves each having a wavelength other than λ2 and going out of the terminal 160d are dropped from the terminal 160f through the 3-dB coupler 163c in two directions. Adjustment has been executed by the refractive index adjusting sections 162c and 162d so that a length of a light path between the 3-dB couplers 163c and 163d is identical, so that all the light waves reach the light transfer path output terminal 160g.

On the other hand, the adding light is sent from the light transmitter 165 connected to the adding terminal 160h to the terminal 160g. The operations is the same as those in a case where a light wave having a wavelength of λ2 and coming in from the light transfer path input terminal 160a is sent to the dropping terminal 160b. Herein, as the reflection coefficient of the fiber gratings 161c and 161d are not 100%, a slight portion of the light reaches the 3-dB coupler 163c, but most of the power is released from the terminal 160e. Even if an extremely small portion of the light goes from the terminal 160f to the terminal 160d due to an incomplete isolation by the 3-dB coupler 163c, most of the light is reflected by the fiber gratings 161a, 161b, and is aborted from the terminal 160c. So only the light waves having passed through the fiber gratings 161a and 161b leak into the light receiver 164.

Assuming that isolation in all of the 3-dB couplers 163a, 163b, 163c, 163d is η and a reflection coefficient of all the fiber gratings 161a, 161b, 161c, 161d is R, the final crosstalk X is expressed by the following expression: (Ô indicates the n-th power)

$$X = \{(1-R)\eta/(1-\eta)\}\hat{0}2/\{R/1-\eta)\} \quad (5)$$

Figure 17:
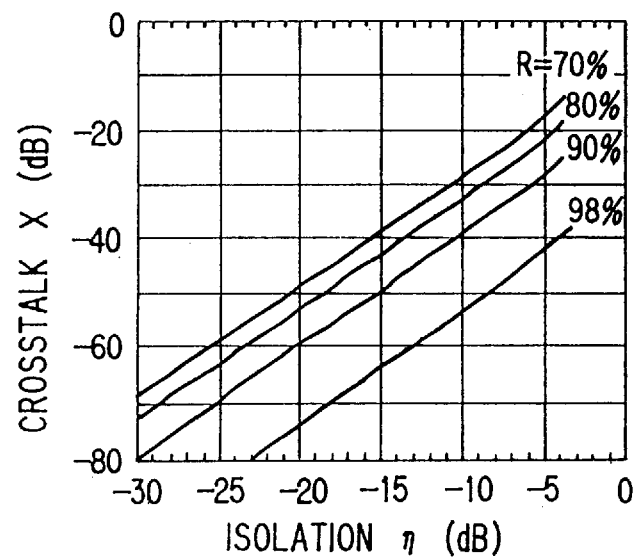
FIG. 17 is a view of computing results for explaining an effect in Embodiment 8 according to the present invention.

Even when R is 93% and n is 0.1, X is 5.85×10 Ô−5 (=−42 dB), which indicates that the crosstalk can be suppressed at a fully low level. FIG. 17 shows a case where a crosstalk X against isolation η is computed using the reflection coefficient R as a parameter. Even if the reflection coefficient R can be increased at most up to 70%, the crosstalk can be suppressed at −39 dB or below by realizing the isolation of only −15 dB.

As described above, an optical dropping/adding circuit is formed by connecting two gratings in series via a 3-dB coupler, so that generation of crosstalk between an adding light and a dropping light can be reduced.

It should be noted that, although description of the embodiment above assumes use of a fiber grating as a wavelength selective reflector, the same effect can be achieved also by using a grating wave guide path formed on a flat optical substrate. Also the above description assumes use of a 3-dB coupler as a directional coupler, but a coupler is not always limited to a 3-dB coupler.

Figure 18:
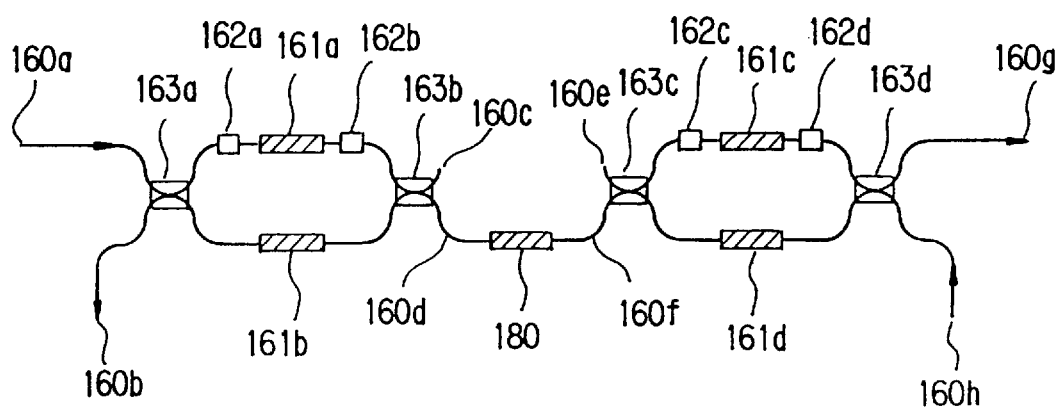
FIG. 18 is a block diagram showing Embodiment 9 according to the present invention.

An object of the present embodiment is to further improve the crosstalk characteristics shown in Embodiment 8. FIG. 18 shows configuration of the present embodiment. In this figure, designated at the reference numeral 163a, 163b, 163c, 163d is a 3-dB coupler respectively, at 161a, 161b, 161c, 161d a fiber grating having the same Bragg's wavelength of λ2 respectively, and at 162a, 162b, 162c, 162d a refractive index adjusting section respectively. Also designated at the reference numeral 160a is a light transfer path input terminal, at 160b a dropping terminal, at 160c, 160d a terminal in a rear stage of the 3-dB coupler 163b respectively, at 160e, 160f a terminal in a front stage of the 3-dB coupler 163c, at 160g a light transfer path output terminal, and at 160h an adding terminal. This embodiment is characterized in that a fiber grating 180 having a Bragg's wavelength of λ2 is added a new between the terminals 160d and 160f.

Description is made for operations in this embodiment. Of the WDM light waves coming in from the light transfer path input terminal 160a, only light waves having a wavelength of λ2 are reflected by the fiber grating 161a, 161b and can be fetched out from the dropping terminal 160b of the 3-dB coupler 163a. The refractive index adjusting section 162a is provided so that a length of a light path from the 3-dB coupler 163a to the fiber grating 161a will be identical to that from the 3-dB coupler 163a to the fiber grating 161b. Light waves each having a wavelength other than λ2 and not reflected there reach the 3-dB coupler 163b, and a refractive index adjusting section 162b is provided herein so that a phase of reflected light will be reverse to that of not-reflected light. Namely all light waves each having a wavelength other than λ2 go out of the terminal 160d.

The light waves each having a wavelength other than λ2 and going out of the terminal 160d are dropped from the terminal 160f through the 3-dB coupler 163c in two directions. Adjustment has been executed by the refractive index adjusting sections 162c and 162d so that a length of a light path between the 3-dB couplers 163c and 163d is identical, so that all the light waves reach the light transfer path output terminal 160g. On the other hand, the adding light is sent from the adding terminal 160h to the terminal 160g. The operations is the same as those in a case where a light wave having a wavelength of λ2 and coming in from the light transfer path input terminal 160a is sent to the dropping terminal 160b.

In a case where a reflection coefficient of the fiber gratings 161a and 161b does not reach 100% which is an ideal value, a wavelength of λ2 coming in from the light transfer path input terminal 160a can not fully be reflected, which causes a crosstalk with a light wave having a wavelength of λ2 added from the terminal 160h, and for this reason a transfer characteristic may be degraded. A slight portion of the light wave having a wavelength of λ2 from the fiber gratings 161a and 161b reaches the terminal 160d of the 3-dB coupler 163b, but most of the power is reflected by the following fiber grating 180. The reflected light is reflected again by the fiber gratings 161a and 161b and is aborted from the terminal 160c. Even if some of the light can not be reflected by the fiber grating 180, most of the light is reflected by the fiber gratings 161c and 161d, and is aborted from the terminal 160e.

A rate X in which a wavelength of λ2 coming in from the light transfer path input terminal 160a becomes a crosstalk of a light wave having a wavelength of λ2 added from the terminal 160h is computed. Assuming that isolation in all of the 3-dB couplers 163a, 163b, 163c, 163d is η and a reflection coefficient of all the fiber gratings 161a, 161b, 161c, 161d, 180 is R, the X is expressed by the following expression:

$$X = I\{(\eta\hat{0}2)(1-R)\hat{0}3\}/\{R/(1-\eta)\} \quad (6)$$

On the other hand, a rate X in which the wavelength of λ2 coming in from the adding terminal 160h becomes a crosstalk of a light wave having a wavelength of λ2 to be dropped to the dropping terminal 160b can be given by the following expression.

$$X=\{(1-\eta)(1-R)\hat{0}3\}/R \qquad (7)$$

Figure 19:
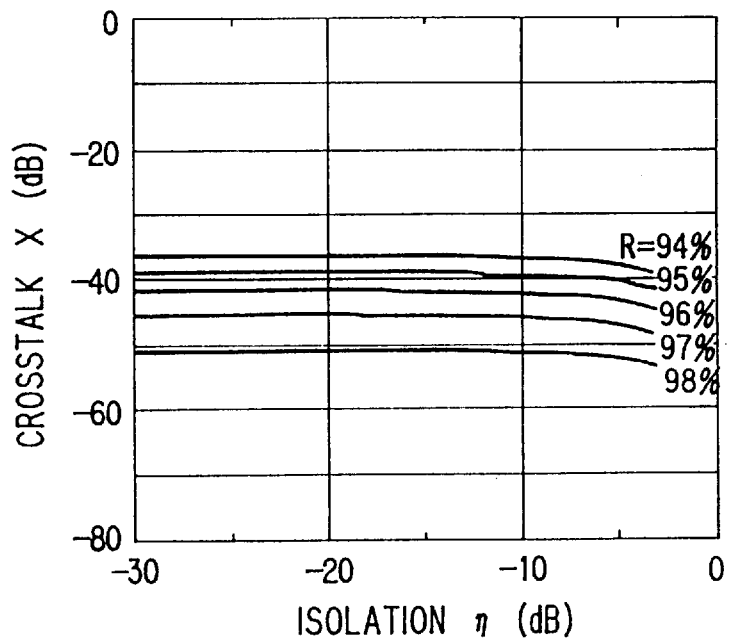
FIG. 19 is a view of computing results for explaining an effect in Embodiment 9 according to the present invention.
Figure 20:
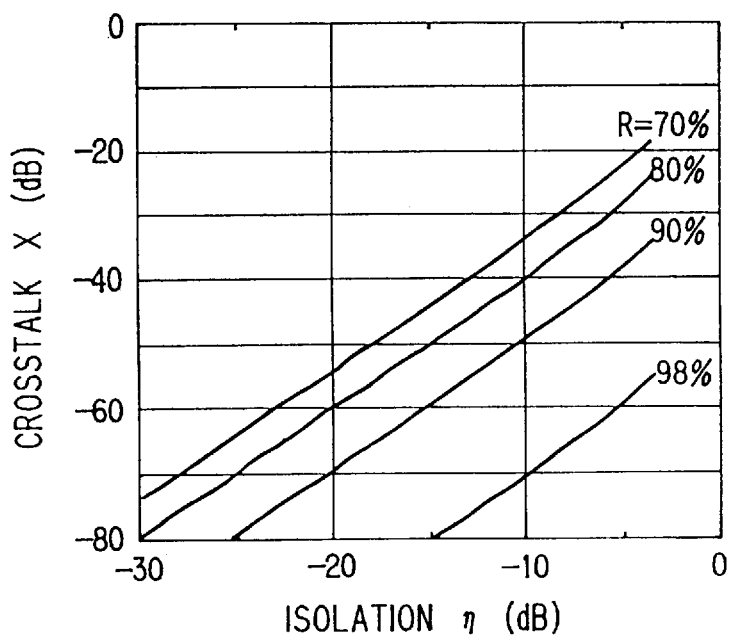
FIG. 20 is a view of computing results for explaining an effect in Embodiment 9 according to the present invention.
Figure 21:
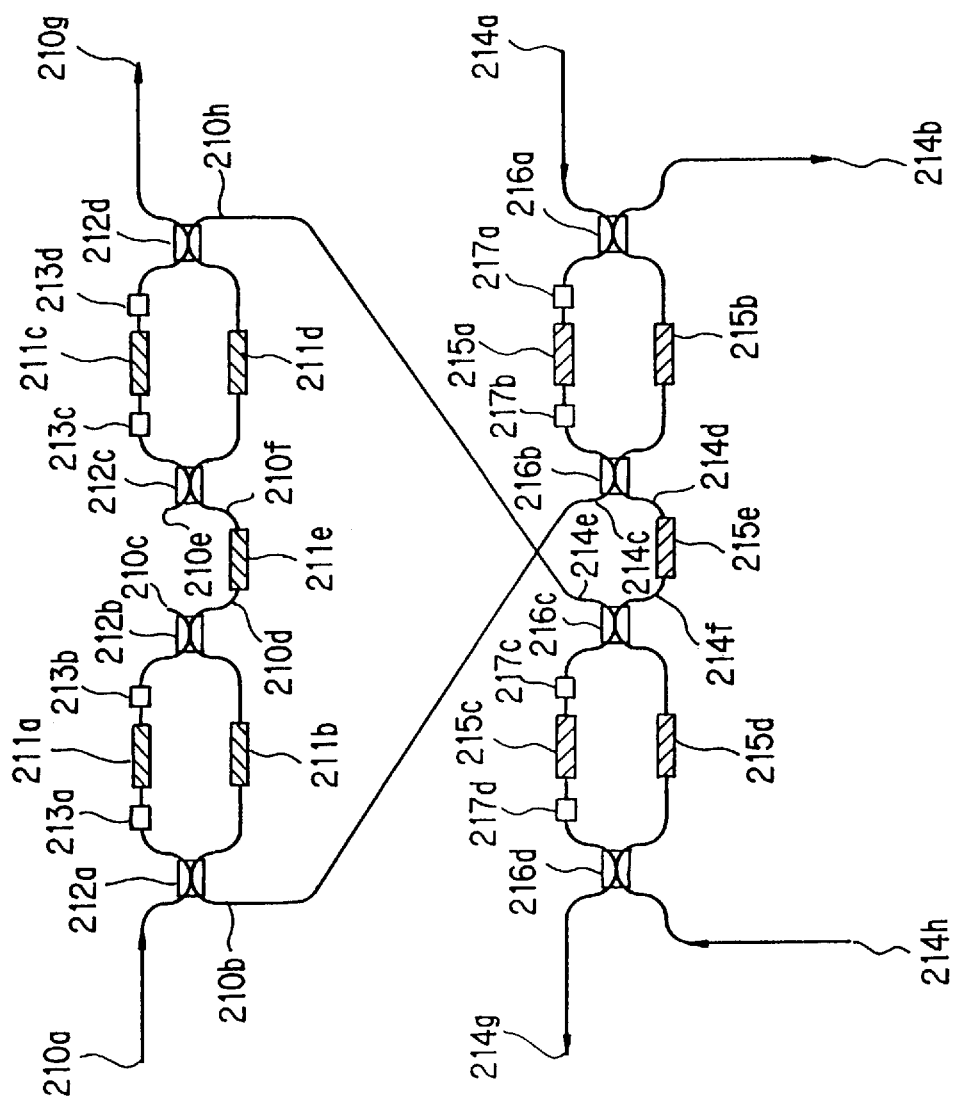
FIG. 21 is a block diagram showing Embodiment 10 according to the present invention.

FIG. 19 shows a case where a crosstalk of a light wave having a wavelength of λ2 added from the terminal 160h that having a wavelength of λ2 coming in from the light transfer path input terminal 160a is computed using the isolation η as a parameter. If a reflection coefficient R of the fiber grating can be increased by 95% or more, the crosstalk can be suppressed at −39 dB or below, which does not effect to the transfer characteristics. Also FIG. 20 show a case where a crosstalk of a light wave having a wavelength of λ2 to be dropped to the terminal 160b that having a wavelength of λ2 coming in from the adding terminal 160h is computed using the isolation η as a parameter. The crosstalk characteristics can be further improved than that in Embodiment 8, and even if a reflection coefficient can be increased at most up to 70%, the crosstalk can be suppressed at −40 dB or below by realizing the isolation of only −13-dB.

As described above, an optical dropping/adding circuit is formed by connecting two gratings in series via a 3-dB coupler, so that generation of crosstalk between an adding light and a dropping light can be reduced.

It should be noted that, although description of the embodiment above assumes use of a fiber grating as a wavelength selective reflector, the same effect can be achieved also by using a grating wave guide path formed on a flat optical substrate. Also the above description assumes use of a 3-dB coupler as a directional coupler, but a coupler is not always limited to a 3-dB coupler.

An object of the present embodiment is to provide a method of constructing an optical branch circuit by using the wavelength multiplexed light transfer unit according to either Embodiment 8 or Embodiment 9. FIG. 20 shows configuration of the present embodiment. In this figure, designated at the reference numeral 210a is an up-light transfer path input terminal, at 210b a dropping terminal, at 210c, 210d a terminal in a rear stage of a 3-dB coupler 212b respectively, at 210e, 210f a terminal in a front stage of a 3-dB coupler 212c, at 210g an up-light transfer path output terminal, at 210h an adding terminal. Designated at the reference numeral 211a, 211b, 211c, 211d, 211e is a fiber grating having the same Bragg's wavelength of λ2 respectively, and at 213a, 213b, 213c, 213d a refractive index adjusting section respectively. Also designated at the reference numeral 214a is a down-light transfer path input terminal, at 214b a dropping light transfer path output terminal, at 214c, 214d a terminal in a rear stage of the 3-dB coupler 216b respectively, at 214e, 214f a terminal in a front stage of the 3-dB coupler 216c, at 214g an up-light transfer path output terminal, and at 214h a dropping light transfer input terminal. Designated at the reference numeral 215a, 215b, 215c, 215d, 215e is a fiber grating having the same Bragg's wavelength of λ1 respectively, and at 217a, 217b, 217c, 217d a refractive index adjusting section respectively.

Description is made for operations in this embodiment. Of the WDM light waves coming in from the up-light transfer path input terminal 210a, light waves having a wavelength other than λ2 are not reflected by the fiber grating 211a, 211b and reach a 3-dB coupler 212b, but the refractive index adjusting section 213a and 212b are provided so that a phase herein of the wavelengths are reverse. Namely, all of the wavelengths other than λ2 is sent from the terminal 210d.

The wavelengths other than λ2 sent from the terminal 210d are dropped from the terminal 210f through the 3-dB coupler 212c into two directions. An adjustment is provided by the refractive index adjusting sections 213c and 213d so that a length of light path between the 3-dB coupler 212c and 212d are identical, so that all the light waves can reach the up-light transfer path output terminal 210g.

Of the WDM light waves coming in from the up-light transfer path input terminal 210a, only light waves having a wavelength of λ2 are reflected by the fiber grating 211a, 211b and can be fetched out from the dropping terminal 210b of the 3-dB coupler 212a. The refractive index adjusting section 212a is provided so that a length of a light path from the 3-dB coupler 212a to the fiber grating 211a will be identical to that from the 3-dB coupler 212a to the fiber grating 211b. The fetched light waves each having a wavelength of λ2 come in from the terminal 214c of the 3-dB coupler. As a Bragg's wavelength of the fiber gratings 215a, 215b is λ1, light waves each having a wavelength of λ2 do not reflect here, and all the light waves are outputted from the dropped light transfer path transfer input terminal 214d.

Of the WDM light waves coming in from the down-light transfer path input terminal 214a, light waves having a wavelength other than λ1 are not reflected by the fiber grating 215a, 215b and reach a 3-dB coupler 216b, but the refractive index adjusting section 217a and 217b are provided so that a phase herein of the wavelengths are reverse. Namely, all of the wavelengths other than λ1 is sent from the terminal 214d. The wavelengths other than λ1 sent from the terminal 214d are dropped from the terminal 214f through the 3-dB coupler 216c to two directions. An adjustment is provided by the refractive index adjusting sections 217c and 217d so that a length of light path between the 3-dB coupler 216c and 216d are identical, so that all the light waves can reach the down-light transfer path output terminal 214g.

Of the WDM light waves coming in from the down-light transfer path input terminal 214a, only light waves having a wavelength of λ1 are reflected by the fiber grating 215a, 215b and can be fetched out from the dropping light transfer path output terminal 214b.

Light waves each having a wavelength of λ2 added from the dropping light transfer path input terminal 214h are not reflected by the fiber grating 215c, 215d and reach the 3-dB coupler 216c, but the refractive index adjusting section 217c and 217d are provided so that a phase herein of the wavelengths are reverse. Namely, all of the wavelengths of λ2 is sent from the terminal 214e. The wavelengths of λ2 sent from the terminal 214e are dropped from the terminal 210h through the 3-dB coupler 212d to two directions. An adjustment is provided by the refractive index adjusting sections 213d so that a length of light path from the 3-dB coupler 212d to the fiber grating 211c is identical to that from the 3-dB coupler 212d to the fiber grating 211d, so that all the light waves can reflect to the up-light transfer path output terminal 210g.

Figure 22:
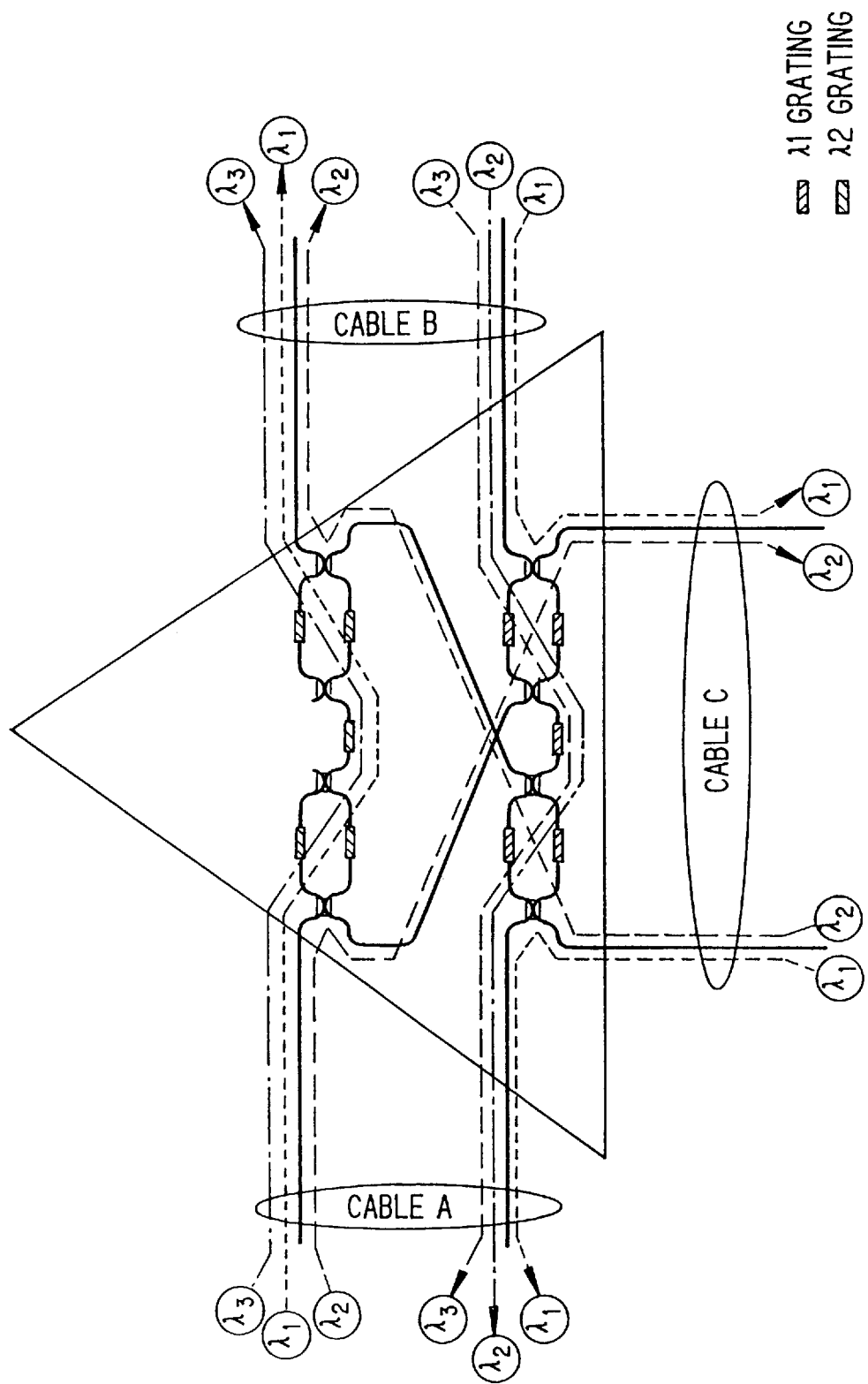
FIG. 22 is a block diagram showing operations in Embodiment 10 according to the present invention.

The operations described above can further be understood with FIG. 22. It is assumed that a cable A and a cable B are trunk light transfer paths, and a cable C is a dropping light transfer path. A light wave having a wavelength of λ2 inputted from the cable A and a light wave having a wavelength of λ1 inputted from the cable B are multiplexed and outputted to the cable C. To receive a light wave from the cable C, a light wave having a wavelength of λ1 and that having a wavelength of λ2 are multiplexed. A path for a wavelength of λ2 is automatically set to a direction of the cable A, and a path for a wavelength of λ1 is automatically set to a direction of the cable B. Herein, a wavelength of λ3 is not reflected by any of the fiber gratings, so that the wavelength of λ3 passes through between the cable A and cable B. Any wavelengths other than λ1 and λ2 can be passed through between the cable A and cable B.

In the present embodiment, the wavelength multiplexed light transfer unit according to Embodiment 9 is used, but the same effect can be achieved also by using the wavelength multiplexed light transfer unit according to Embodiment 8. It is needless to say, however, that using the wavelength multiplexed light transfer unit according to Embodiment 9 can achieve crosstalk characteristics more excellent than those achieved according to Embodiment 8. It should be noted that the above description assumes use of a fiber grating as a wavelength selective reflector, but the same effect can be achieved also by using a grating wave path formed on a flat optical substrate. Also the above description assumes use of a 3-dB coupler as a directional coupler, but a coupler is not always limited to a 3-dB coupler.

Figure 23:
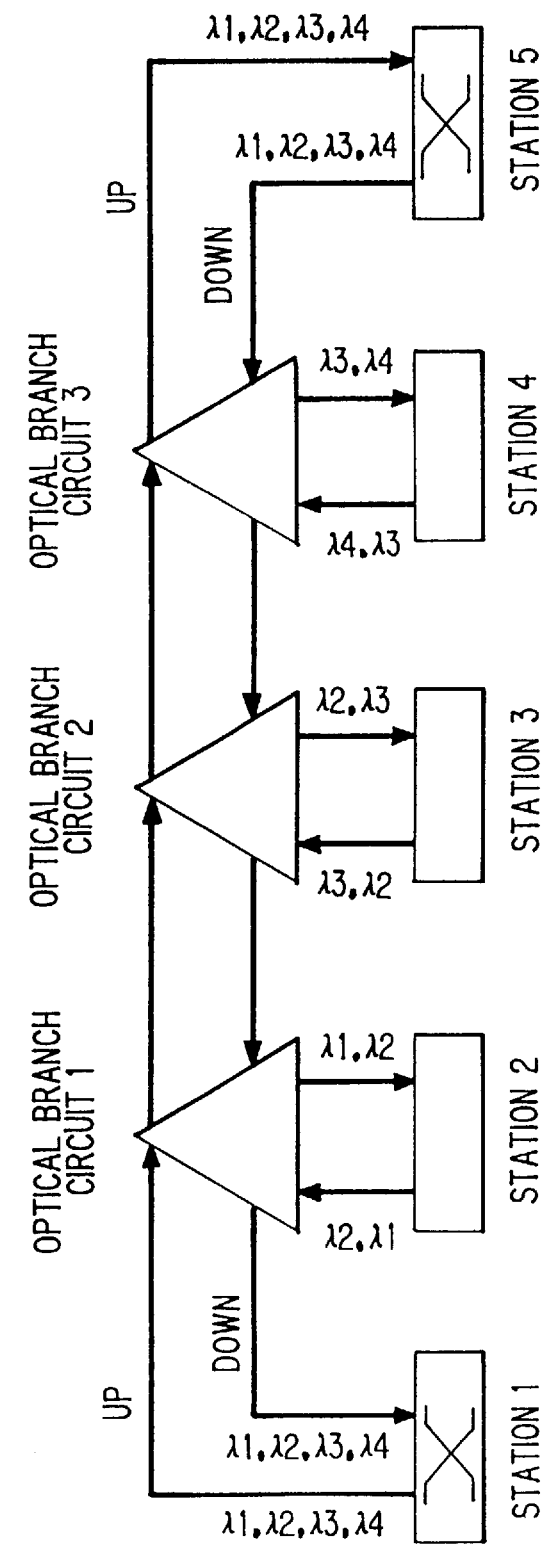
FIG. 23 is a block diagram for explaining an example of a system application shown in Embodiment 10 according to the present invention.

FIG. 23 shows an example of applying a network in this embodiment. Description is made herein for a method of communications in which five stations are connected to each other based on a full-mesh system. In the figure, a station 1 is cross-connected to the station 5. Four wavelengths of λ1, λ2, λ3, λ4 each for transferring a up-light transfer path are used for communications from the station 1 to another station. Similarly four wavelengths of L, λ2, λ3, λ4 each for transferring a down-light transfer path are used for that from the station 5 to another station. For instance, a wavelength of λ3 is used for communications from the station 1 to a station 4. Of the WDM light waves transferred through the up-light transfer path, only the wavelength of λ3 is dropped by the optical branch circuit 3 and reaches the station 4. The wavelength of λ3 is used again for communications from the station 4 to the station 5. Also, a wavelength of λ2 is used for communications from the station 5 to the station 2. Of the WDM light waves transferred through the down-light transfer path, only the wavelength of λ2 is dropped by the optical branch circuit 1 and reaches the station 2. The wavelength of λ2 is used again for communications from the station 2 to the station 1. On the other hand, for communications from the station 2 to the station 4, at first a signal sent out from the station 2 with a wavelength of λ1 is added to a WDM light in the optical branch circuit 1, and reaches the station 5 through the up-light transfer path. Herein a wavelength through the light transfer path is changed from the wavelength of λ1 to wavelength of λ3, and the wavelength of λ3 is dropped to the station 4 from the down-light transfer path through the optical branch circuit 3. As described above, a wavelength is changed to another one in a station where cross connect is executed, which makes it possible to connect among all the stations based on the full-mesh system. With this system, a number of wavelengths can become a constant number (in this case: four wavelengths) in any section of the light transfer path, which does not cause degradation of transfer characteristics due to a gain deviation in an optical amplifying relay. Also, any N stations can be connected to each other with a wavelength of (N−1) which is a small number of wavelength.

An object of the present embodiment is to make it possible to switch a wavelength of a light wave dropped and added to a light transfer path.

Figures 24, 25:
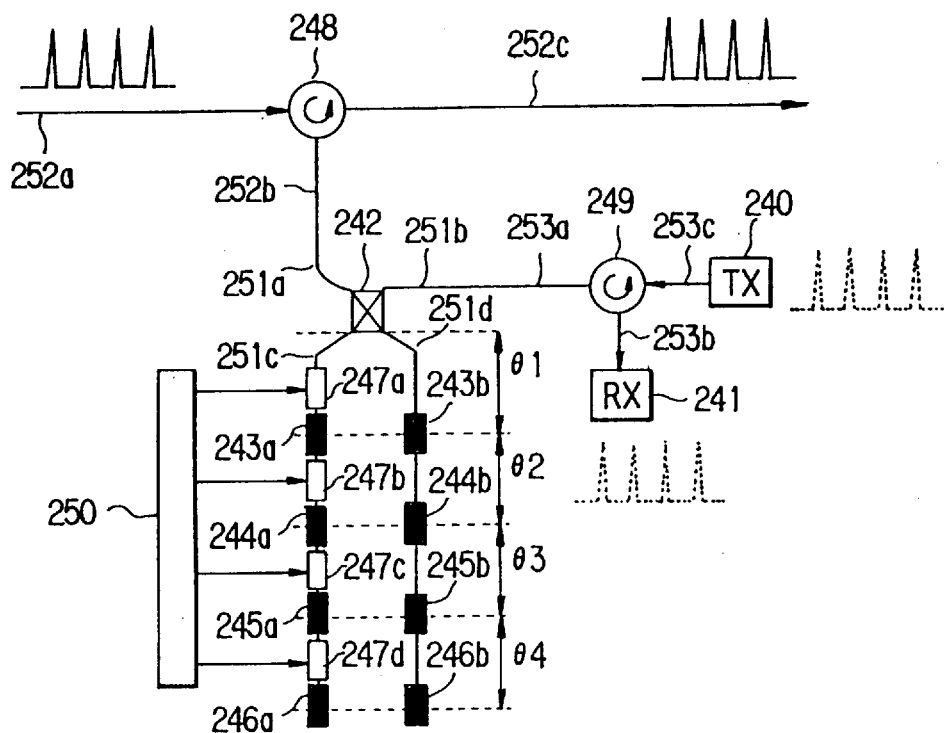
FIG. 24 is a block diagram showing Embodiment 11 according to the present invention.
FIG. 25 is a view showing a relation between a transmission wavelength and a phase shift rate of a light phase shifter shown in Embodiment 11 according to the present invention.

FIG. 24 shows configuration of the present embodiment. In this figure, designated at the reference numeral 240 is a light transmitter, at 241 a light receiver, at 242 3-dB coupler, at 243a, 243b a fiber grating for a light wave having a Bragg's wavelength of λ1 respectively, at 244a, 244b a fiber grating for a light wave having a Bragg's wavelength of λ2, at 245a, 245b a fiber grating for a light wave having a Bragg's wavelength of λ3 respectively, at 246a, 246b a fiber grating for a light wave having a Bragg's wavelength of λ4, at 247a, 247b, 247c, and 247d an optical phase shifter respectively, at 248, 249 an optical circulator respectively, at 250 a phase control circuit, at 251a, 251b, 251c, 251d a terminal of the 3-dB coupler 30, at 252a a light transfer path input terminal, at 252b a dropping/adding terminal, and at 252c an optical transfer path output terminal. Also designated at the reference numeral 235a is a dropping/adding terminal of the optical circulator 249, at 253b a dropping terminal, to which the light receiver 241 is connected. The reference numeral 253c indicates an adding terminal of the optical circulator 249, to which the light transmitter 240 is connected.

Any type of device may be used as the optical phase shifters 247a, 247b, 247c, 247d so long as the device can change a phase of a light wave in a range from 0 to π/2. The devices available for this purpose include, for instance, a LiNbO$_3$ optical phase modulator, a device which changes an refractive index of a quartz light wave guide path with heat, or a device which extends or compresses a fiber coil with piezoelectricity. Each of the optical phase shifters 247a, 247b, 247c, 247d can set its phase shift rate to zero (0) or π/2 according to a signal from the control circuit 250.

Next, a description is made for operations in this embodiment. The WDM light coming in from the light transfer path input terminal 252a is sent by the optical circulator 248 via the dropping/adding terminal 252b to the terminal 251a of the 3-dB coupler 242. The 3-dB coupler 242 branches the light wave coming in from the terminal 251a to two directions 251c and 251d, and if a phase of the light phase-shifted by the optical phase shifter 247a, 247b, 247c, 247d each connected to the terminal 251c, reflected by a fiber grating, and returned again to the terminal 251c is reverse to a light wave reflected by a fiber grating connected to the terminal 251d and returned to the terminal 251d, the 3-dB coupler 242 sends the light via the optical circulator 249 connected to the terminal 251d to the light receiver 241. Namely, the WDM light coming in from the light path input terminal 252a is dropped to the light receiver 241. If phases of the two light waves are identical, the 3-dB coupler 242 sends the light to the terminal 251a, and then the light is sent via the optical circulator 248 to the light transfer path output terminal 252c. Namely the WDM light coming in from the light transfer input terminal 252a is transmitted to the light transfer path output terminal 252c.

The light transmitter 240 sends the light wave having a reverse phase described above via the optical circulator 249 to the terminal 251b. In the 3-dB coupler 242, light waves dropped to the terminals 251c and 251d are reflected and the reflected light waves return with a reverse phase to the terminal 251b and are outputted to the terminal 251a, and then are sent via the optical circulator 248 connected to the terminal 251a to the light transfer output terminal 252c. Namely, the light from the light transmitter 240 is added and multiplexed to the WDM light.

As described above, an optical dropping/adding circuit can be formed by using a light wave having a reverse phase as a dropped/adding light and also by using a light wave having the same phase as a transmitted light.

Next description is made for a case where, of the multiplexed light wave synthesized from four ones having wavelengths from λ1 to λ4 respectively, a light wave having the wavelength of λ2 is dropped and added. Phase shift rates for the optical phase shifters 247a, 247b, 247c, and 247d are set by the phase control circuit 250, as shown in FIG. 25, so that, when light waves coming in from the terminal 251a of the 3-dB coupler 242 are reflected and again return to the terminal 251a, a phase of the light wave having the wavelength of λ2 is reverse to the original one, and phases of the other light waves each having a wavelength other than λ2 are identical to their original ones.

FIG. 25 shows a rate for each of the optical phase shifters 247a, 247b, 247c, and 247d to shift a phase of each light wave having a wavelength to be dropped, and assuming herein that a wavelength to be dropped is λ2, the phase shift rates by the optical phase shifters 247a, 247b, 247c, and 247d are set by the phase control circuit 250 to π/2, π/2, π/2 and 0 respectively.

And the light having a wavelength of λ2 from the terminal 251a of the 3-dB coupler 242 is reflected with a reverse phase, while light waves having wavelengths of λ1, λ3, λ4 respectively are reflected with the same phase, as shown in this figure.

Assuming that a length of a light path between each fiber grating is set equal, then the phase difference is a phase shift rate set by the optical phase shifter itself. Herein it is assumed that the phase differences are θ1, θ2, θ3, and θ4 respectively.

The phase difference from the 3-dB coupler 242 to the fiber gratings 243a, 243b where the light wave having a wavelength of λ1 is reflected is

θ1=π/2.

The light wave reflected by the fiber gratings 243a, 243b is reciprocally subjected to phase shift by π. For this reason, a phase of the light when it has returned to the terminal 251a of the 3-dB coupler 242 becomes identical to the original one, so that the light is outputted to the terminal 251a.

The phase difference from the 3-dB coupler 242 to the fiber gratings 244a, 244b where the light wave having a wavelength of λ2 is reflected is:

θ1+74 2=π.

The light wave reflected by the fiber gratings 244a, 244b is reciprocally subjected to phase shift by 2π in all. For this reason, a phase of the light when it has returned to the terminal 251a of the 3-dB coupler 242 is reverse to the original one, so that the light is outputted to the terminal 251b.

The phase difference from the 3-dB coupler 242 to the fiber gratings 245a, 245b where the light wave having a wavelength of λ3 is reflected is:

θ1+θ2+θ3=3π/2.

The light wave having a wavelength of λ3 reflected by the fiber gratings 245a, 245b is reciprocally subjected to phase shift by 3π in all. For this reason, a phase of the light when it has returned to the terminal 251a of the 3-dB coupler 242 is identical to the original one, the light is outputted to the terminal 251a.

The phase difference from the 3-dB coupler 242 to the fiber gratings 246a, 246b where the light wave having a wavelength of λ4 is reflected is:

θ1+θ2+θ3+θ4=3π/2.

The light wave having the wavelength of λ4 reflected by the fiber gratings 246a, 246b is reciprocally subjected to phase shift by 3π in all. For this reason, a phase of the light wave when it has returned to the terminal 251a of the 3-dB coupler 242 is identical to the original one, the light wave is outputted to the terminal 251a.

As described above, a target terminal for output of a light wave having a specific wavelength can be switched to either the terminal 251a or terminal 251b by controlling a shift rate by each optical phase shifter.

Then, only the dropping light wave having the wavelength of λ2 is inputted from the terminal 251b to the terminal 253a of the optical circulator 249, but the optical circulator 249 is designed so that it outputs only a light coming in from the terminal 253a to the terminal 253b, and for this reason, of the 4 WDM light waves, only the light wave having a wavelength of λ2 can be received by the light receiver 241. On the other hand, the light waves each having a different wavelength go from the terminal 251a to the terminal 252c of the optical circulator 248, but the optical circulator 248 is designed so that it outputs the light coming in from the terminal 252b to the terminal 252c, so that, as a result, of the 4 WDM light waves, those each having a wavelength other than λ2 pass to the terminal 252c.

An adding light having a wavelength of λ2 generated from the light transmitter 240 passes from the terminal 253c through the optical circulator 249 and is sent to the terminal 251b of the 3-dB coupler 242. As described above, the phase difference from the 3-dB coupler 242 to the fiber gratings 244a, 244b into which the light wave having the wavelength of λ2 goes in is π, and the light wave having the wavelength of λ2 reflected by the fiber gratings 244a, 244b is reciprocally subjected to phase shift by 2π in all. For this reason, a phase of the light wave when it has returned to the terminal 251b of the 3-dB coupler 242 is reverse to the original one, so that the light wave is outputted to the terminal 251a. This light passes through the optical circulator 248 and is outputted to the terminal 252c. Namely the adding light is multiplexed with the WDM light having a different wavelength.

Similarly, light waves having wavelength of λ1, λ3, and λ4 can be dropped and added by setting a phase shift rate by each of the optical phase shifters 247a, 247b, 247c, and 247d with the phase shift controller 250 as shown in FIG. 25.

The above description assumes a case where 4 light waves are multiplexed, but this system can be extended to any number of light waves each having a different wavelength. Also the above description assumes that only one light wave having a specific wavelength is dropped and added, but the same scheme is applicable to a case where a plurality of light waves each having a different wavelength are multiplexed. Next, a description is made for setting a phase shift rate in that case.

Assuming that a phase shift rate by the i-th optical phase shifter is θi, each θ is set so that the following conditions are satisfied.

$$\sum_{i=1}^{i-k} \theta_i = \left( \frac{1}{2} \div m \right) \pi$$

$$\sum_{i=1}^{k} \theta_i = n\pi$$

Herein, k is a number of a wavelength to be dropped, while m and n are arbitral integral numbers. Namely, a phase difference from the 3-dB coupler to the fiber grating which reflects a light wave having a wavelength λk to be dropped is multiplied by an integral number, and at the same time the control is provided so that a phase difference to other fiber gratings is kept at an integral number time of π/2. Herein k is not necessarily limited to one. Namely in the present invention, a plurality of light waves each having a different wavelength can be dropped.

Also, although the above description assumes a case where a plurality of fiber gratings are connected in multiple stages, but as it is necessary to finely control a phase of each light wave, the compact configuration of a flat optical circuit is more preferable. For instance, a light path from the 3-dB coupler 242 to the fiber gratings 246a, 246b may be formed with a quartz light wave guide path, and a heater electrode may be provided to thermally change a refractive index as a function of an optical phase shifter.

As described above, a plurality of gratings are connected in multiple stages and a phase shift rate for each reflected light is changed according to a wavelength, so that a wavelength for a dropping light and that for an adding light can freely be selected.

Although the above description assumes a case where a fiber grating is used as a wavelength selective reflector, the same effect can be achieved also by using a grating light wave guide path formed on a flat optical substrate. Also the above description assumed use of a 3-dB coupler as a directional coupler, but a coupler available for this purpose is not always limited to a 3-dB coupler.

An object of the present embodiment is to provide a bidirectional filter in which crosstalk hardly occurs.

Figure 26:
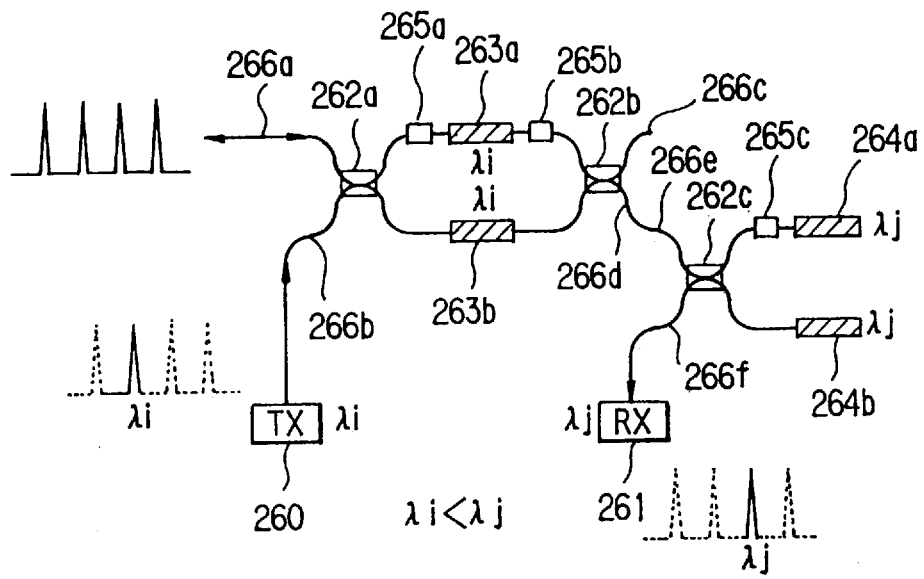
FIG. 26 is a block diagram showing Embodiment 12 according to the present invention.

FIG. 26 shows configuration of the present embodiment. In the figure, designated at the reference numeral 260 is the light transmitter for a wavelength $\lambda i$, at 261 the light receiver for receiving a wavelength $\lambda j$, at 262a, 262b, and 262c the 3-dB coupler respectively, at 263a and 263b the fiber grating respectively in which Bragg's wavelength is $\lambda i$, at 264a and 264b the fiber grating respectively in which Bragg's wavelength is $\lambda j$, at 265a, 265b, and 265c the refractive index adjusting section respectively, at 266a the input/output terminal of bidirectional light transfer path, at 266b the adding terminal, at 266c and 266d the terminal of 3-dB coupler 262c respectively, and at 266e and 266f the terminal of 3-dB coupler 262c, respectively.

Next, a description is made for operations in this embodiment. The light transmitter 260 sends a light wave having a wavelength of $\lambda i$ to the terminal 266b, the 3-dB coupler 262a distributes the incident light, and then the fiber gratings 263a, 263b reflect the incident light, and as a phase of the light when it has returned to the terminal 266b of the 3-dB coupler 262a is reverse to the original one, so that all of the light is sent to the input/output terminal 226a of the bidirectional light transfer path. On the other than, most of the light not reflected by the fiber gratings 263a, 263b is aborted to the terminal 266c. It should be noted that a length of a light path between the 3-dB coupler 262a and 3-dB coupler 262b is set equal by the refractive index adjusting section 265a, 265b. Furthermore, some power is outputted to the terminal 266c due to incomplete isolation by the 3-dB coupler 262b, but all the light is aborted from the fiber gratings 264a and 264b, and never goes into the light receiver 261.

An WDM light wave coming in from the input/output terminal 266a of bidirectional light transfer path is outputted to the terminal 266d through the 3-dB couplers 262a and 262b. A light wave having a wavelength of $\lambda j$ thereamong is reflected by the fiber gratings 264a and 264b through the 3-dB coupler 262c, and sent to the light receiver 261 connected to the terminal 266f. Other light waves each having a wavelength other than $\lambda j$ are not reflected on the fiber gratings 264a and 264b and aborted there. Accordingly the optical filter according to the embodiment operates to the WDM light wave coming from the input/output terminal 266a of bidirectional light transfer path as a band pass filter to the wavelength of $\lambda j$.

The fiber grating formed in the wave guide path has such properties that a passage loss is small when a light wave having a wavelength longer than Bragg's wavelength is transmitted therethrough, and that an excessive passage loss is generated when a light having a short wavelength is transmitted therethrough, although a grating wave guide path formed on the flat optical substrate has no such property described above. So the Bragg's wavelength of $\lambda i$ of the fiber gratings 263a and 263b is made shorter than the Bragg's wavelength of $\lambda j$ of the fiber gratings 264a and 264b. And for this reason, although a light wave having a wavelength of $\lambda j$ passes through the fiber gratings 263a and 263b, an excessive passage, loss is not generated herein because the Bragg's wavelength of $\lambda i$ is shorter than that of $\lambda j$.

As described above, in a case where some portion of an adding light is not reflected on the fiber gratings 263a and 263b and leaked, the leaked light wave transmits the 3-dB coupler 262b with the phase reverse to that of a dropping light, so that it is easily possible to construct a bidirectional optical filter in which crosstalk is hardly generated, and at the same time to avoid increase of a loss generated according to whether a wavelength is longer or shorter.

Although the above description assumes use of a fiber grating as a wavelength selective reflector, the same effect as described above can be achieved also by using a wave guide path for grating formed on the flat optical substrate. Also the above description assumes use of a 3-dB coupler as a directional coupler, it is not limited to the 3-dB coupler An object of the present embodiment is to provide a bidirectional optical filter in which crosstalk hardly occurs.

Figure 27:
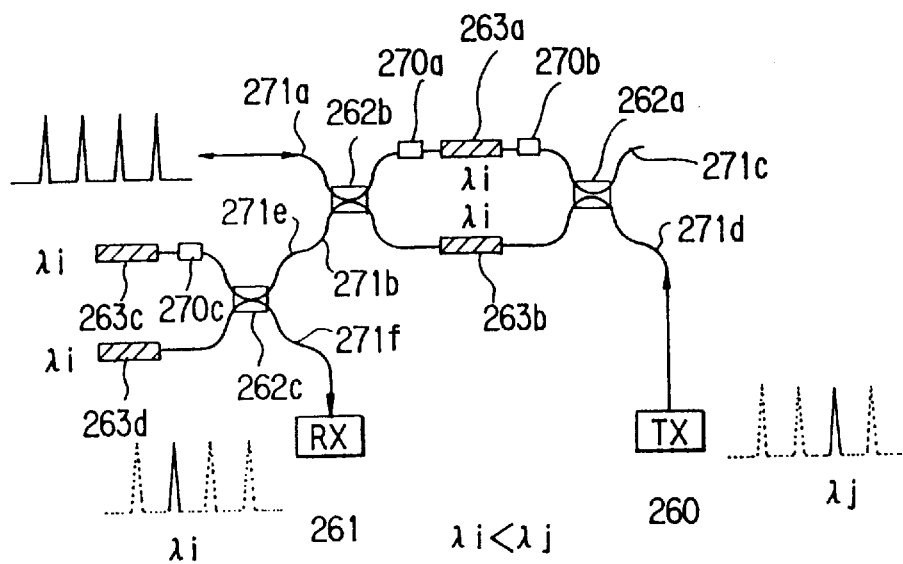
FIG. 27 is a block diagram showing Embodiment 13 according to the present invention.
Figure 28:
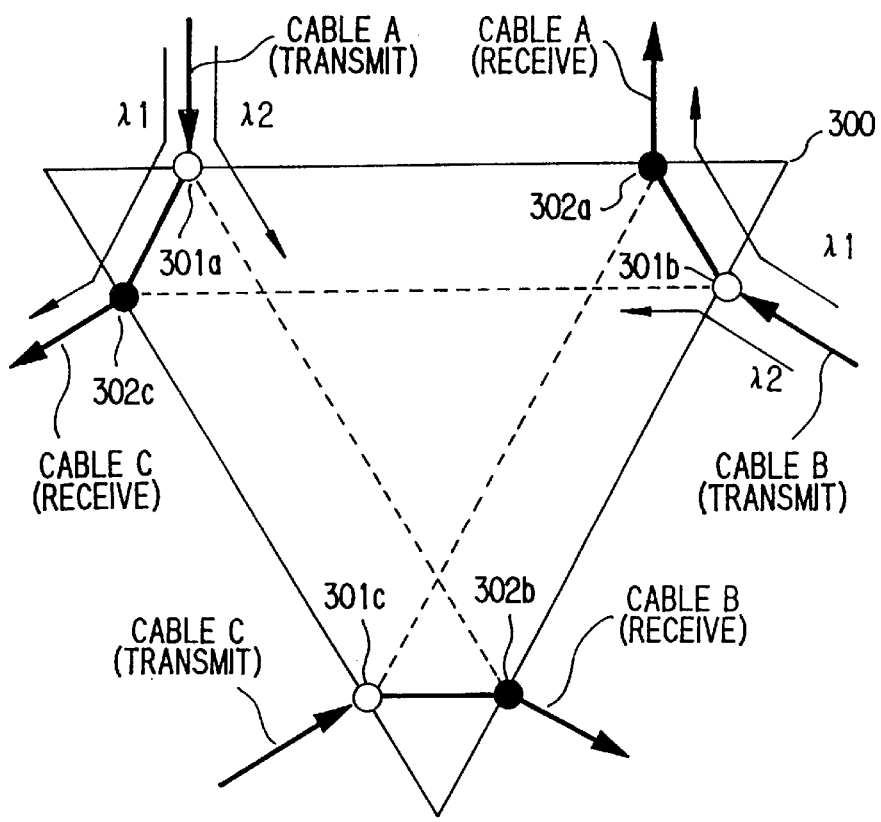
FIG. 28 is a block diagram showing Example 1 based on the conventional type thereof.
Figure 29:
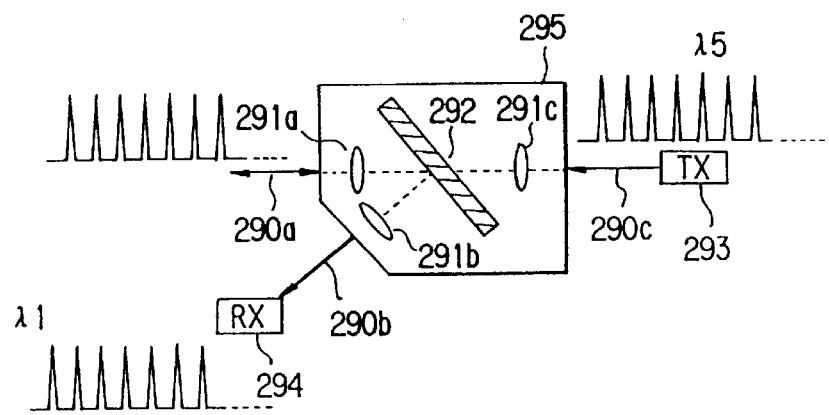
FIG. 29 is a block diagram showing a dielectric multi-layered film filter in Example 1 based on the conventional type thereof.
Figure 30:
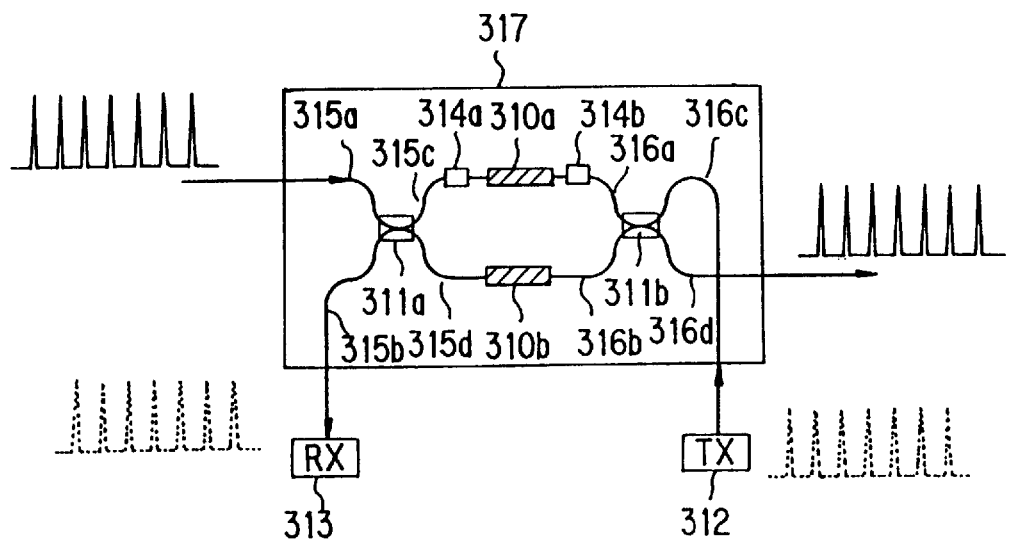
FIG. 30 is a block diagram showing Example 2 based on the conventional type.
Figure 31:
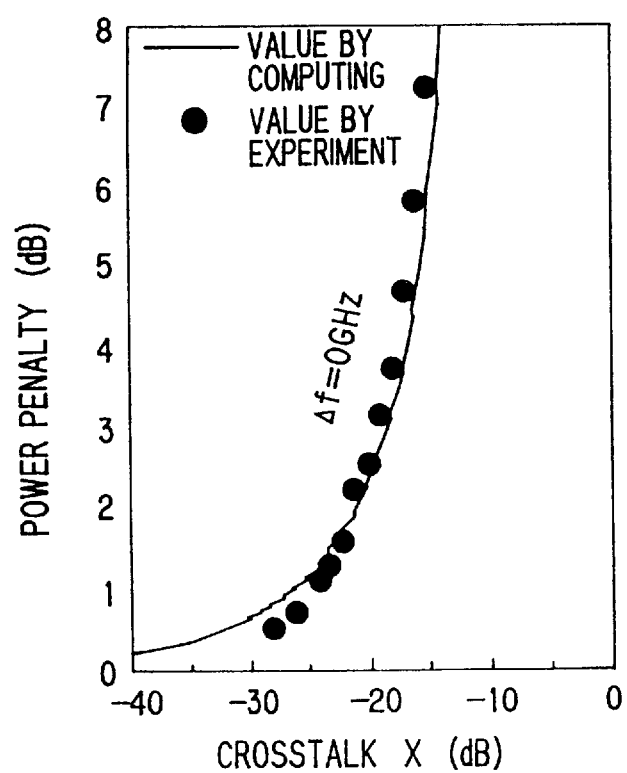
FIG. 31 is a view showing a power penalty to crosstalk of an optical filter according to Example 2 based on the conventional type thereof obtained by computing and experiment.

Fig. 27 shows configuration of the present embodiment. In the figure, designated at the reference numeral 260 is the light transmitter of a wavelength of $\lambda j$ at 261 the light receiver for receiving a wavelength of $\lambda i$, at 262a, 262b, and 262c the 3-dB coupler respectively at 263a and 263b each fiber grating in which a Bragg's wavelength is $\lambda i$, at 263c and 263d each fiber grating in which a Bragg's wavelength is $\lambda i$, at 270a, 270b, and 270c the refractive index adjusting section respectively, at 271a an input/output terminal of the bidirectional light transfer path, at 271b a terminal of the 3-dB coupler 262b, at 271c and 271d a terminal of the 3-dB coupler 262a respectively, at 271e and 271f a terminal of the 3-dB coupler 262c respectively.

The light wave coming in from the input/output terminal 271a of the bidirectional light transfer path and having a wavelength of $\lambda i$ is distributed at the 3-dB coupler 262b, reflected by the fiber gratings 263a, 263b, and return to the terminal 271b of the 3-dB coupler 262b again, and in this step a phase of the light is reverse to the original one, so that all of the light is outputted to the terminal 271b. Herein a length of a light path between the 3-dB coupler 262b and 3-dB coupler 262a is set equal by the refractive index adjusting sections 270a, 270b. Furthermore the light passes from the terminal 271e through the 3-dB coupler 262c, is reflected by the fiber gratings 263c, 263d, and then return to the terminal 271e of the 3-dB coupler 262c again, and in this step a phase of the light is reverse to the original one, so that all of the light is sent to the light receiver 261 connected to the terminal 271f. For this reason, the optical filter according to the present embodiment works against the WDM light coming in from the bidirectional light transfer path input/output terminal 271a as a band-pass filter for a light having a wavelength of $\lambda i$.

A light wave having a wavelength of $\lambda j$ coming in from the light transmitter 260 to the terminal 271d is outputted to the terminal 271a through the 3-dB couplers 262a and 262b.

However, a little amount of the power is leaked out to the terminal 271*b* due to incomplete isolation by the 3-dB coupler 262*b*. Although the leaked power goes to the fiber gratings 263*c* and 263*d* from the 3-dB coupler 262*c*, the light wave having a wavelength of λi is not reflected thereon and aborted because Bragg's wavelength thereof are different from each other. Accordingly, there is no possibility that the wavelength λj coming in from the terminal 271*d* is leaked into the light receiver 261 to cause crosstalk.

As described in Embodiment 12, a fiber grating has characteristics that a passage loss is small when a light wave having a wavelength longer than the Bragg's wavelenqth is transmitted therethrough, but an excessive passage loss is generated when a light wave having a short wavelength is transmitted therethrough. And for this reason, the Bragg's wavelength of λi of the fiber gratings 263*a* and 263*b* is set shorter than that of λj of the adding light wave.

Consequently, although the light wave having a wavelength of λj passes through the fiber gratings 263*a* and 2631*b*, an excessive, passage loss is not generated herein because the Bragg's wavelength of λi is shorter than that of λj.

As described above, an adding-light is not reflected on the fiber gratings 263*c* and 263*d* by leaking some portion thereof even a slightest amount due to incomplete isolation of the 3-dB coupler 262*b*, so that it is possible to easily construct a bidirectional optical filter in which crosstalk is hardly generated, and at the same time to avoid increase of a loss generated according to whether a wavelength is longer or shorter.

Although the above description assumes use of a fiber grating as a wavelength selective reflector, the same effect can be achieved also by using a grating wave guide path formed on a flat optical substrate. Also the above description assumes use of a 3-dB coupler as a directional coupler, but it is not always limited to a 3-dB coupler.

As described above, it is possible to use the optical filter according to the present invention as an optical submarine relay by connecting an optical amplifier to any one of the input/output optical fibers of the optical filter according to each aspect of the invention from Embodiment 1 to Embodiment 13, and further by accommodating the entire configuration in a pressure housing.

In the first aspect of the invention, different from the dielectric multilayered film filter which is required to be connected to a bulk element in a space by using a conventional type of lens, the optical filter is constructed by using a directional coupler and a wavelength selective reflector, and furthermore three types of optical filters are connected to each other with an optical fiber by connecting them to each other in a shape of star, and for this reason, it is possible to construct a high-reliability optical branch circuit in which there are generated little crosstalk as well as insertion loss.

In the second aspect of the invention, it is possible to increase terminal stations each accommodated in the wavelength multiplexed light transfer system by vertically connect the wavelength multiplexed light transfer units to each other. And it is also possible to insure a communication path for communicating between terminal stations by separating a troubled portion therefrom even if any trouble occurs in the transfer path.

In the third aspect of the invention, different from the dielectric multilayered film filter which is required to be connected to a bulk element in a space by using a conventional type of lens, the optical filter is constructed by using a directional coupler and a wavelength selective reflector, and furthermore three types of optical filters are connected to each other with an optical fiber by connecting them to each other in a shape of star, and for this reason, it is possible to construct a high-reliability optical branch circuit in which there are generated little crosstalk as well as insertion loss, and also to set many wavelengths which go through a specified path.

In the fourth aspect of the invention, the optical dropping/adding circuit, which allocates specific wavelengths for receiving and transmission in each station, is provided, so that optical communication can be made with any station.

In the fifth aspect of the invention, a plurality of wavelength selective reflectors are vertically connected to each other in between the two directional couplers, so that a plurality of wavelengths can simultaneously be dropped and added thereto.

In the sixth aspect of the invention, a plurality of selective reflectors provided between the two directional couplers can be integrated to one section, so that it is possible to reduce a number of refractive index adjusting sections of an optical circuit which can simultaneously drop and add a plurality of wavelengths, and adjustment of a 3-dB coupler and a length of light path can easily be made.

In the seventh aspect of the invention, the light transmitter displaces a transmission wavelength by a specified value to a receiving wavelength by the light receiver, so that, even if crosstalk is generated during transmittance of the wavelength from the light transmitter to the light receiver, it is possible to reduce a transfer penalty due to the cause described above.

In the eighth aspect of the invention, the dropping/adding circuit is constructed by vertically connecting the two units of wavelength selective reflectors to each other through the directional coupler, so that it is possible to reduce crosstalk between an adding light and a dropping light.

In the ninth aspect of the invention, the dropping/adding circuit is constructed by vertically connecting the two units of wavelength selective reflectors to each other through the directional coupler and further by providing a wavelength selective reflector between the directional couplers, so that it is possible to reduce crosstalk between an adding light and a dropping light.

In the tenth aspect of the invention, different from the dielectric multilayered film filter which is required to be connected to a bulk element in a space by using a conventional type of lens, the optical filters can be constructed so that all of the filters are connected to each other with optical fibers by connecting two units of dropping/adding circuit, to the filters, each vertically connected to two units of wavelength selective reflectors through a directional coupler, and for this reason, it is possible to construct a high-reliability optical branch circuit in which there are generated little crosstalk as well as insertion loss.

In the eleventh aspect of the invention, a phase shift rate of a reflected light is changed by connecting a plurality of wavelength selective reflectors to each other in multistage and depending on the wavelength therefrom, so that it is possible to switch a wavelength of a dropping light to that of an adding light, and vice versa.

In the twelfth aspect of the invention, an adding light which is not reflected is dropped and put off by the directional couplers in 2 stages so that the light is not leaked into the light receiver, so that it is possible to construct a bidirectional optical dropping/adding circuit in which crosstalk is hardly generated.

In the thirteenth aspect of the invention, the fiber grating is used as a wavelength selective reflector, and a wavelength longer than a Bragg's wavelength is used as a dropping light, so that it is possible to reduce a loss generated when the dropping light passes through the fiber grating.

In the fourteenth aspect of the invention, an adding light from the light transmitter is dropped and put off by the directional couplers in 2 stages so that it is possible to construct a bidirectional optical dropping/adding circuit in which crosstalk is hardly generated.

In the fifteenth aspect of the invention, the fiber grating is used as a wavelength selective reflector, and a wavelength longer than a Bragg's wavelength is used as an adding light, so that it is possible to reduce a loss generated when the adding light passes through the fiber grating.

This application is based on Japanese patent application No. HEI 7-216164 filed in the Japanese Patent Office on Aug. 24, 1995 and Japanese patent application No. HEI 7-271215 filed in the Japanese Patent Office on Oct. 19, 1995, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A wavelength multiplexed light transfer unit comprising:

a first optical filter having a first terminal for receiving a light signal having a specified wavelength $\lambda 1$ as well as a light signal having a wavelength other than the wavelength $\lambda 1$, a second terminal for outputting the light signal having a wavelength $\lambda 1$ inputted into this first terminal, a third terminal for outputting a light signal having a wavelength other than the wavelength $\lambda 1$ inputted into said first terminal; and a second optical filter having a fourth terminal for receiving the light signal having a wavelength other than the wavelength $\lambda 1$ outputted from the third terminal of this first optical filter, a fifth terminal for receiving the light signal having the specified wavelength $\lambda 1$ as well as that having a wavelength other than the wavelength $\lambda 1$, and a sixth terminal for outputting the light signal having a wavelength other than the wavelength $\lambda 1$ inputted into said fourth terminal as well as a transmitted light signal having a wavelength $\lambda 1$ inputted into said fifth terminal.

2. A wavelength multiplexed light transfer unit comprising:

a first optical filter having a first terminal for receiving a light signal having a specified wavelength $\lambda 1$ as well as a light signal having a wavelength other than the wavelength $\lambda 1$, a second terminal for outputting the light signal having a wavelength $\lambda 1$ inputted into this first terminal, a third terminal for outputting a light signal having a wavelength other than the wavelength $\lambda 1$ inputted into said first terminal; and a second optical filter having a fourth terminal for receiving the light signal having a wavelength other than the wavelength $\lambda 1$ outputted from the third terminal of this first optical filter, a fifth terminal for receiving the light signal having the specified wavelength $\lambda 1$ as well as that having a wavelength other than the wavelength $\lambda 1$, and a sixth terminal for outputting the light signal having a wavelength other than the wavelength $\lambda 1$ inputted into said fourth terminal as well as a transmitted light signal having a wavelength $\lambda 1$ inputted into said fifth terminal; wherein the third terminal of said first optical filter and the fourth terminal of said second filter are connected to each other with a wavelength selective reflector in which a center wavelength of reflection is $\lambda 1$.

3. A wavelength multiplexed light transfer unit comprising:

a first optical filter having a first terminal for receiving and outputting a light signal having a specified wavelength $\lambda i$, a light signal having a wavelength $\lambda j$, and a light signal having a wavelength other than the wavelengths $\lambda i$ and $\lambda j$, a second terminal for outputting the light signal having a wavelength $\lambda i$ inputted into this first terminal and receiving a light signal having a wavelength $\lambda i$, and a third terminal for outputting a light signal having a wavelength other than the wavelength $\lambda i$ inputted into said first terminal, said first optical filter outputting the light signal having a wavelength $\lambda i$ inputted into said second terminal to said first terminal;

a second optical filter having a fourth terminal for receiving the light signal having a wavelength other than wavelength $\lambda i$ outputted from the third terminal of said first optical filter and a fifth terminal for outputting the light signal having a wavelength $\lambda j$ inputted into this fourth terminal;

a light transmitter for outputting a light wavelength multiplexed signal for the second terminal of said first optical filter; and a light receiver for receiving the light wavelength multiplexed signal outputted to a second terminal of said second optical filter.

4. A wavelength multiplexed light transfer unit according to claim 3, wherein an optical filter is formed with a grating light guide path in which a wavelength of a first reflected light is shorter than that of a second reflected light as the first optical filter.

5. A wavelength multiplexed light transfer unit comprising;

a first optical filter having a first terminal for receiving and outputting a light signal having a specified wavelength $\lambda i$, a light signal having a wavelength $\lambda j$ and a light signal having a wavelength other than the wavelengths $\lambda i$, $\lambda j$, a second terminal for outputting the light signal having the wavelength $\lambda i$ inputted into this first terminal, and a third terminal for outputting a light signal having a wavelength $\lambda i$ inputted into said thirst terminal, said first optical filter outputting the light signal having the wavelength $\lambda j$ inputted into said third terminal to said first terminal;

a second optical filter having a fourth terminal for receiving a light signal having a wavelength $\lambda i$ outputted from the second terminal of said first optical filter and a fifth terminal for outputting the light signal having the wavelength $\lambda i$ inputted into this fourth terminal;

a light transmitter for outputting a light wavelength multiplexed signal to the third terminal of said first optical filter; and a light receiver for receiving the light wavelength multiplexed signal outputted to the fifth terminal of said second optical filter.

6. A wavelength multiplexed light transfer unit according to claim 5, wherein an optical filter is formed with a grating light guide path in which a wavelength of a first reflected light is shorter than that of a light signal transmitted from said light transmitter as the first optical filter.

* * * * *